United States Patent

Sano et al.

[11] Patent Number: 6,072,590
[45] Date of Patent: Jun. 6, 2000

[54] METHOD AND APPARATUS FOR FORMING HALFTONE DOTS

[75] Inventors: Hiroshi Sano; Hiroshi Asai, both of Tenjinkitamachi, Japan

[73] Assignee: Dainippon Screen Mfg. Co., Ltd., Kyoto, Japan

[21] Appl. No.: 08/864,004

[22] Filed: May 27, 1997

[30] Foreign Application Priority Data

May 27, 1996 [JP] Japan .................................. 8-156131

[51] Int. Cl.⁷ .......................... G06K 15/02; H04N 1/405
[52] U.S. Cl. ............................ 358/1.9; 358/456; 358/459
[58] Field of Search ........................... 358/1.9, 534, 535, 358/536, 456, 457, 458, 459, 460, 298, 466; 382/237, 270

[56] References Cited

U.S. PATENT DOCUMENTS 4,419,690 12/1983 Hammes .................................. 358/534
5,285,291 2/1994 Schiller .

*Primary Examiner*—Scott Rogers
*Attorney, Agent, or Firm*—McDermott, Will & Emery

[57] ABSTRACT

A halftone dot forming method of the invention uses a replicated unit area of prescribed configuration including N pieces of halftone dot areas, where N is an integer of at least 2. An image signal is compared with threshold values assigned to pixels in the replicated unit area to form the halftone dots. The threshold value distribution in the replicated unit area is determined so as to form halftone dots whose areas are substantially equal at an arbitrary halftone dot area rate and which interconnect substantially simultaneously when the halftone dot area rate is 50%.

8 Claims, 22 Drawing Sheets

SINGLE HALFTONE DOT METHOD

SUPERCELL METHOD

PRIOR-ART SUPERCELL

HALFTONE DOT BOUNDARIES IN CASE OF 4 HALFTONE DOTS IN
21X21 BLOCK (SCREEN ANGLE = 0 DEGREE).
BROKEN LINES INDICATE ACTUAL BOUNDARIES.

PRIOR-ART SUPERCELL

HALFTONE DOT BOUNDARIES IN CASE OF 8 HALFTONE DOTS IN 19X19 BLOCK (SCREEN ANGLE = 45 DEGREE).
BROKEN LINES INDICATE ACTUAL BOUNDARIES.

(AT A HALFTONE DOT AREA RATE OF ABOUT 50%, REPLICATION OF THIS BLOCK PRODUCES A MIXTURE OF 5X5, 4X5 AND 5X4 PIXEL HALFTONE DOTS.)

PROFILE LINES OF INDIVIDUAL HALFTONE DOTS IN SUPERCELL

LIGHTING PRECEDENCE IN REDUCED HALFTONE DOT CELL (12 AND HIGHER VALUES OMITTED)

Fig. 13(A)

| m | n=2 HC0 | n=0 HC1 | n=3 HC2 | n=1 HC3 | n=4 HC4 |
|---|---|---|---|---|---|
| → #0 | *2 | *0 | *3 | *1 | *4 |
| #1 | | | | | |
| #2 | | | | | |
| #212 | | | | | |
| #213 | | | ╱ | | |
| #214 | ╱ | ╱ | ╱ | | |

Fig. 13(B)

| m | n=3 HC0 | n=4 HC1 | n=1 HC2 | n=0 HC3 | n=2 HC4 |
|---|---|---|---|---|---|
| #0 | *2 | *0 | *3 | *1 | *4 |
| → #1 | *8 | *9 | *6 | *5 | *7 |
| #2 | | | | | |
| #212 | | | | | |
| #213 | | | ╱ | | |
| #214 | ╱ | ╱ | ╱ | | |

FIRST EMBODIMENT

THE THICK LINES INDICATE THE BOUNDARIES OF
CONVENTIONALLY DEFINED HALFTONE DOT CELLS.
(IN THE SECOND HALFTONE DOT, ◨ CAN BE SELECTED AS
THE NEXT POINT TO LIGHT.
SINCE THE CONNECTION PORTIONS ARE TAKEN INTO
CONSIDERATION BEFOREHAND IN CALCULATING THE
LIGHTING ORDER IN THE RESPECTIVE HALFTONE DOTS,
"SPRAY" SUCH AS SHOWN IN FIG. 15 IS ELIMINATED.)

PRIOR-ART EXAMPLE ANALOGOUS TO THE FIRST EMBODIMENT

■ ▩ ∴ ARE NEXT POINTS TO BE LIT.
WHEN ▩ IS LIT, WHITE POINT BECOMES CONCAVE.
(▩ CORRESPONDS TO INDENTED PORTION OF CONCAVITY.)
WHEN ∴ IS LIT, IT APPEARS AS SPRAY.
(PIXELS ON FOUR SIDES OF ∴ IS NOT LIT)

SECOND EMBODIMENT

THE THICK LINES INDICATE THE BOUNDARIES OF
CONVENTIONALLY DEFINED HALFTONE DOT CELLS.
(IN THE SECOND HALFTONE DOT, ◼ IS SELECTED AS THE
  NEXT POINT TO BE LIT.)

PRIOR-ART EXAMPLE ANALOGOUS TO THE FIRST EMBODIMENT

■🞎: NEXT POINT TO BE LIT
■░: POINT THAT SHOULD BE LIT (IN THE SECOND HALFTONE DOT, ░ WAS DESIRED TO BE LIT BUT COULD NOT BE BECAUSE IT IS IN THE 0-TH HALFTONE DOT, SO 🞎 WAS SELECTED.)

THIRD EMBODIMENT

THE THICK LINES INDICATE THE BOUNDARIES OF
CONVENTIONALLY DEFINED HALFTONE DOT CELLS.

PRIOR-ART EXAMPLE ANALOGOUS TO THE FIRST EMBODIMENT

▒ : NEXT POINT TO BE LIT
▨ : POINT THAT SHOULD BE LIT ( ▨ WAS DESIRED TO BE LIT BUT COULD NOT BE BECAUSE
IT IS NOT INCLUDED IN THE HALFTONE DOT INCLUDING
THE MINIMUM DENSITY MEASUREMENT POINT,
SO ▒ WAS LIT INSTEAD. )

ANOTHER EXAMPLE OF LIGHTING PRECEDENCE IN COMMON AREA

METHOD AND APPARATUS FOR FORMING HALFTONE DOTS

BACKGROUND OF THE INVENTION

1. Field of the Invention

This invention relates to a technology for forming halftone dots by comparing an image signal with threshold values assigned to individual pixels within each of replicated unit areas.

2. Description of the Related Art

Halftone dots are generally formed by use of a halftone dot signal generated by comparing a multilevel image signal with threshold values assigned to individual pixels within each of replicated unit areas. Two methods are available for defining the replicated unit area. In one method a halftone dot area forming a single halftone dot is used as the replicated unit area while in the other a large area including a plurality of halftone dot areas is used as the replicated unit area.

FIG. 1 is an explanatory diagram illustrating the method in which a single halftone dot area (also called a "halftone dot cell") is used as the replicated unit area. In this method the four corners of each halftone dot area coincide with corners of the pixel grid. This halftone dot area can therefore be replicated to tile the entire image surface. This method is, however, considerably restricted as regards the screen rulings and the screen angles that can be realized. This is because the four corners of each halftone dot area have to coincide with corners of the pixel grid.

FIG. 2 is an explanatory diagram illustrating the method in which a large area including a plurality of halftone dot areas is used as the replicated unit area. The illustrated example uses a area including 4×4 halftone dot areas as the replicated unit area. This type of replicated unit area including a number of halftone dot areas is called a "supercell." While the four corners of each supercell coincide with the corners of the pixel grid, the four corners of the individual halftone dot areas do not necessarily coincide with corners of the pixel grid. Since the supercell method is flexible regarding the number of halftone dot areas included in the supercell, it enables the screen rulings and the screen angle to be realized with greater freedom in the rational tangent method. The rational tangent method is a method of forming halftone dots so that the tangent of the screen angle is a rational number.

Ordinarily, however, the halftone dot areas in a supercell do not all consist of the same number of pixels; they generally include different numbers of pixels. FIGS. 3 and 4 are explanatory diagrams illustrating examples of prior-art supercells with a screen angle of 0 degrees and a screen angle of 45 degrees, respectively. In FIG. 3, the supercell includes a halftone dot area with 11×11 pixels, a halftone dot area with 11×10 pixels, a halftone dot area with 10×11 pixels and a halftone dot area with 10×10 pixels. Thus the halftone dot areas included in the supercell do not always have the same number of pixels. As a result, the number of lit pixels, or recorded pixels, in the halftone dots also differs between different halftone dots even when an image with a uniform halftone dot area rate is to be reproduced. This is even clearer from FIG. 4. Specifically, at a halftone dot area rate of 50% the supercell of FIG. 4 results in formation of halftone dots consisting of 5×5 pixels, halftone dots consisting of 4×5 pixels and halftone dots consisting of 5×4 pixels. The viewer may observe unevenness in such a halftone dot image.

Accordingly, since the individual halftone dots do not always consist of the same number of pixels in the supercell method, the prior art method is liable to produce unevenness in the halftone dot image.

SUMMARY OF THE INVENTION

Accordingly, an object of the present invention is to provide a technology for reducing unevenness in the supercell method.

In order to attain at least part of the above and other objects, the present invention provides a method of forming halftone dots according to comparison of threshold values assigned to pixels in a replicated unit area with an image signal. The replicated unit area has prescribed configuration including N pieces of halftone dot areas where N is an integer of at least 2. The method comprises the step of: forming halftone dots whose areas are substantially equal at an arbitrary halftone dot area rate and which interconnect substantially simultaneously when a halftone dot area rate is 50%.

Since the areas of the halftone dots are approximately equal at any halftone dot area rate, unevenness does not arise in the resulting halftone dot image. Further, since the halftone dots interconnect substantially simultaneously when the halftone dot area rate is about 50%, a halftone dot image with a halftone dot area rate of about 50% can be reproduced with high image quality.

The distribution of the threshold values in each the replicated unit area may be determined by the steps of: (a) establishing a common area with respect to each halftone dot area included in the replicated unit area, and establishing lighting precedence for the pixels in an expanded halftone dot areas including the common area and the each halftone dot area, the common areas being commonly included in a plurality of adjacent halftone dot areas; (b) determining a selection order of the N pieces of halftone dot areas included in the replicated unit area each time when next N pieces of threshold values are to be assigned to pixels in the replicated unit area; (c) successively selecting the N pieces of halftone dot areas in accordance with the determined selection order, and assigning each of the next N pieces of threshold values to a pixel which is included in the expanded halftone dot area for the selected halftone dot area and which has not been assigned a threshold value; and (d) repeating the steps (b) and (c) to thereby assign a threshold value to every pixel included in the replicated unit area.

In a preferred embodiment, the step (c) comprises a step of selecting a pixel to be assigned a threshold value in accordance with the lighting precedence in the expanded halftone dot area.

Alternatively, the step (c) may comprise a step of selecting a pixel to be assigned a threshold value so as to minimize a shift of a center of gravity of halftone dots included in the expanded halftone dot area.

The step (c) may comprise a step of selecting a pixel to be assigned a threshold value so as to minimize deviation of a density value calculated for prescribed points in the replicated unit area.

The present invention is also directed to an apparatus for forming halftone dots according to comparison of threshold values assigned to pixels in a replicated unit area with an image signal. The apparatus comprises: a memory storing the threshold values, the threshold values being determined such that halftone dots are to be formed whose areas are substantially equal at an arbitrary halftone dot area rate and which interconnect substantially simultaneously when a halftone dot area rate is 50%; and a comparator for comparing a threshold value read from the memory and the image signal to generate a halftone dot signal representing the halftone dots.

The present invention is further directed to a computer program produce for forming halftone dots according to comparison of threshold values assigned to pixels in a replicated unit area with an image signal. The computer program product comprises: a computer readable medium; and computer program code means recorded on the computer readable medium. The computer program code means comprises program code means for causing a computer to form halftone dots whose areas are substantially equal at an arbitrary halftone dot area rate and which interconnect substantially simultaneously when the halftone dot area rate is 50%.

These and other objects, features, aspects, and advantages of the present invention will become more apparent from the following detailed description of the preferred embodiments with the accompanying drawings.

BRIEF DESCRIPTION OF THE DRAWINGS

FIGS. 13(A) and 13(B) show a set of explanatory tables showing the nature of the processing in steps S17–S19;

DESCRIPTION OF THE PREFERRED EMBODIMENT

Figure 1:
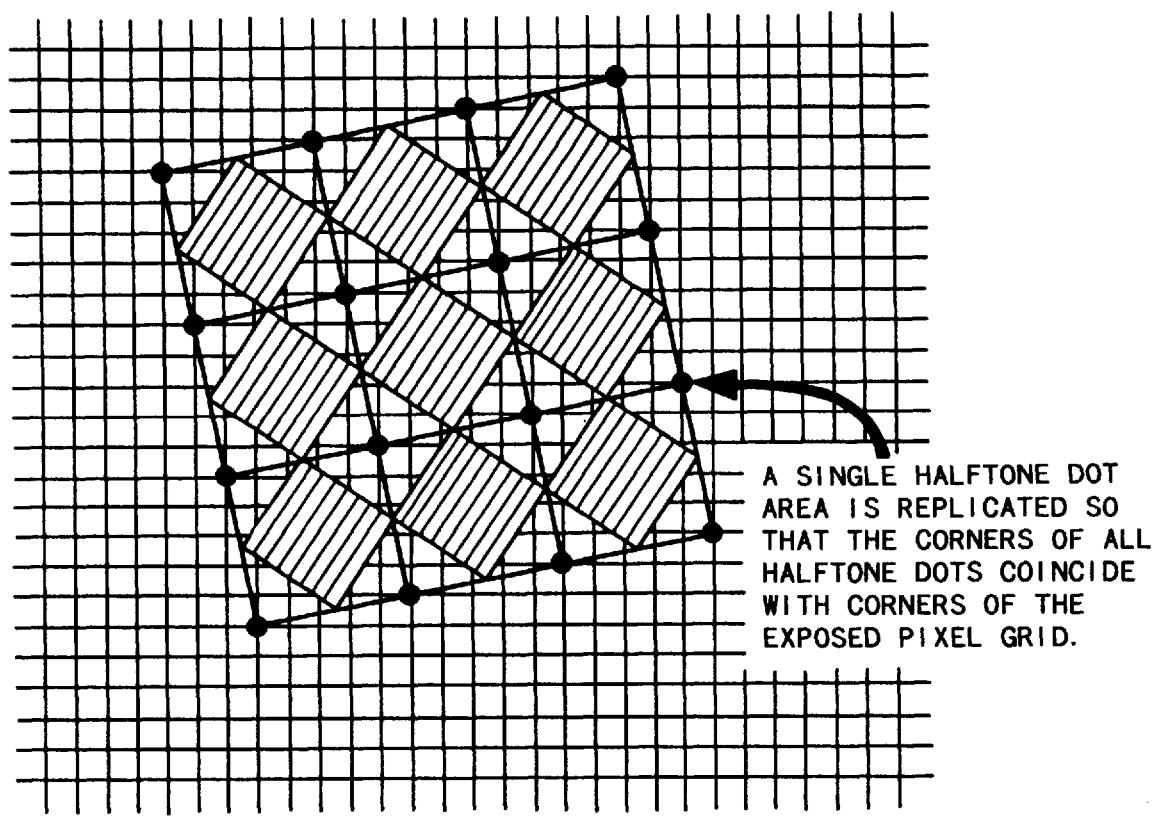
FIG. 1 is an explanatory diagram illustrating a method in which a single halftone dot area is used as a replicated unit area.
Figure 2:
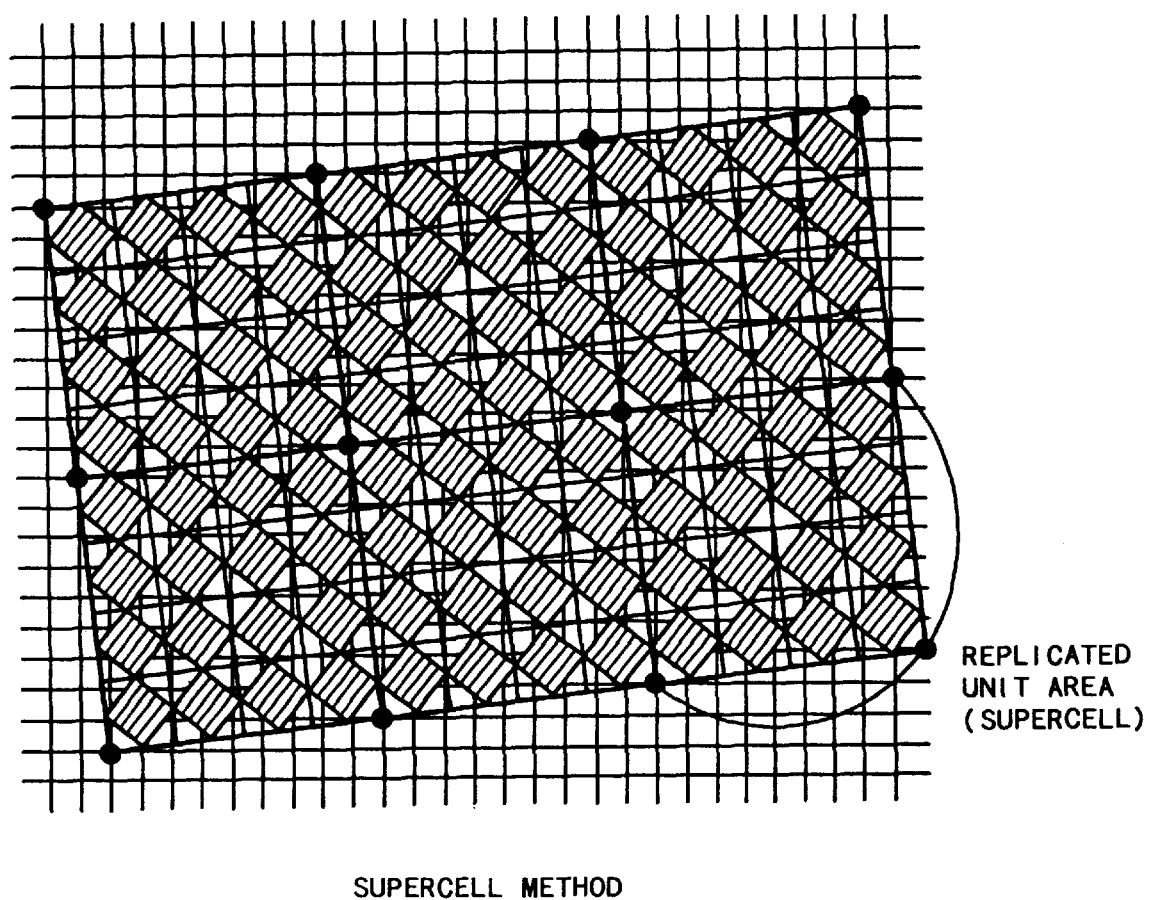
FIG. 2 is an explanatory diagram illustrating a method in which a large area including a plurality of halftone dot areas is used as a replicated unit area.
Figure 3:
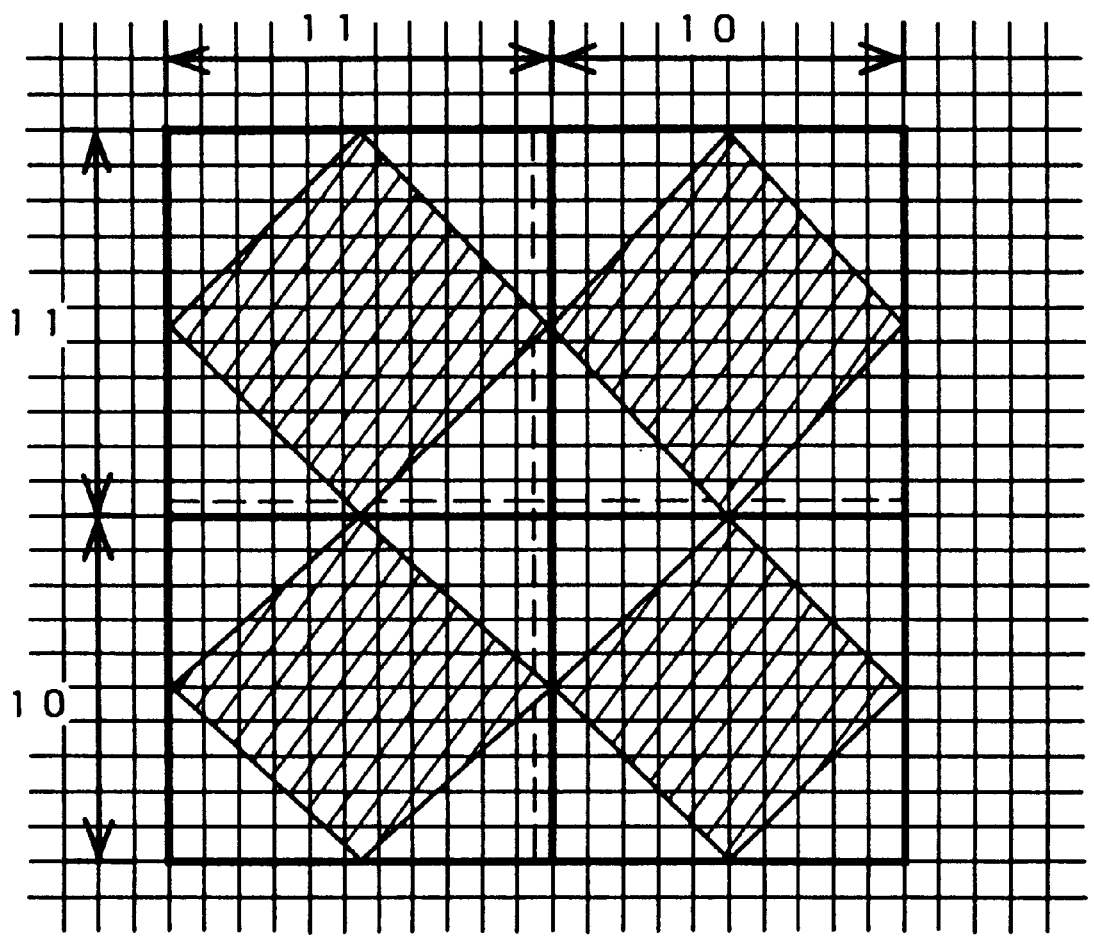
FIG. 3 is an explanatory diagram illustrating an example of a prior-art supercell.
Figure 4:
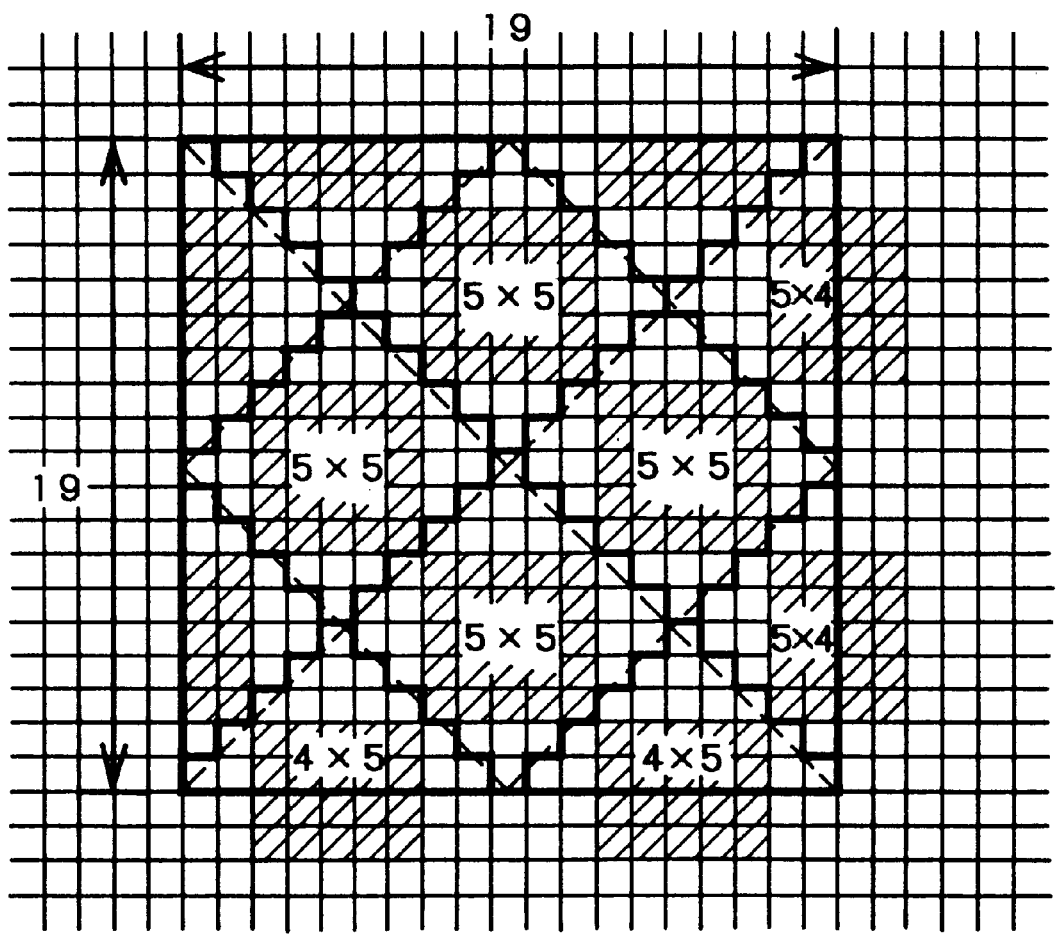
FIG. 4 is an explanatory diagram illustrating an example of a prior-art supercell.
Figure 5:
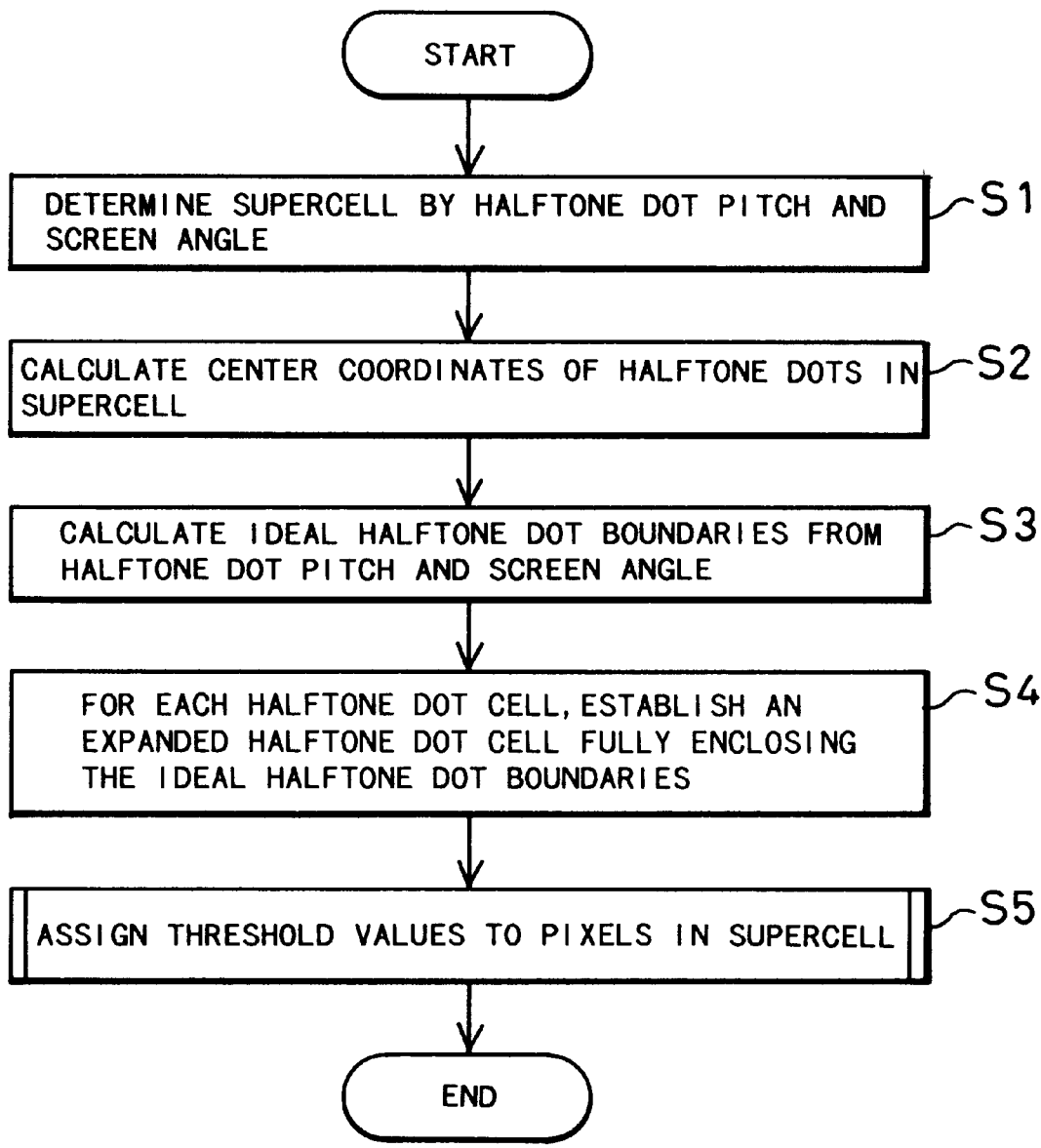
FIG. 5 is a flowchart of the overall processing procedure for determining supercell threshold value distribution in an embodiment of the invention.
Figure 6:
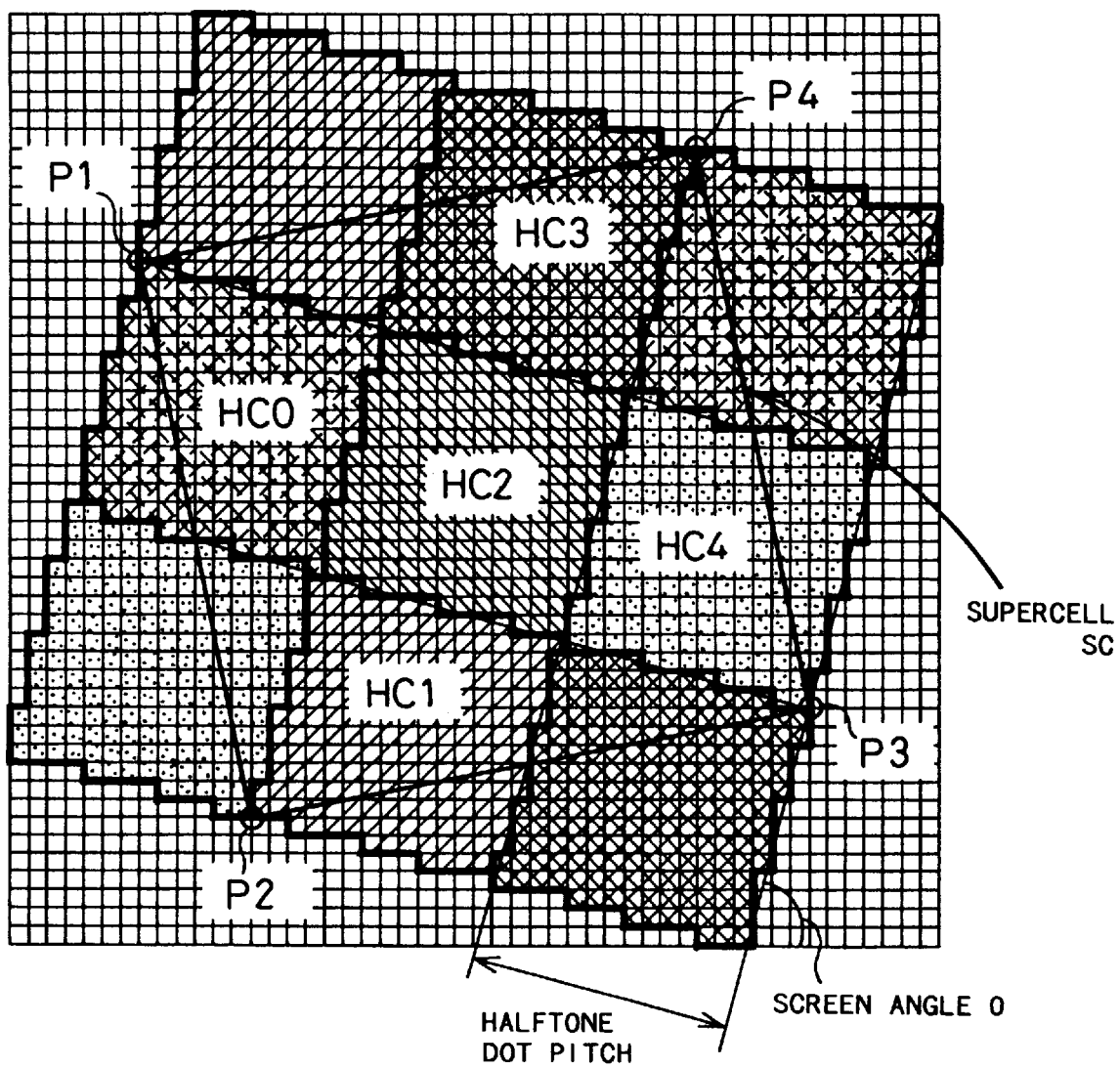
FIG. 6 is an explanatory diagram showing a supercell used in the embodiment.

FIG. 5 is a flowchart of the overall processing procedure for determining supercell threshold value distribution in a first embodiment of the invention. In step S1, a supercell for achieving the desired halftone dot pitch and screen angle is determined. FIG. 6 is an explanatory diagram showing a supercell SC used in this embodiment. This supercell SC consists of five halftone dot cells (halftone dot areas) HC0–HC4. The fine, square grid is the pixel grid. The four corners P1–P4 of the supercell SC coincide with corners of the pixel grid but the corners of the halftone dot cells do not necessarily coincide with corners of the pixel grid. The four corners P1, P2, P3 and P4 of the supercell SC respectively coincide with corners of halftone dot cells HC0, HC1, HC4 and HC3. This supercell SC can therefore be replicated to tile the entire image plane with halftone dot cells HC0–HC4 without leaving any gaps. As the supercell for achieving a particular combination of halftone dot pitch and screen angle is not necessarily limited to one, there is some room for choice.

Figure 7:
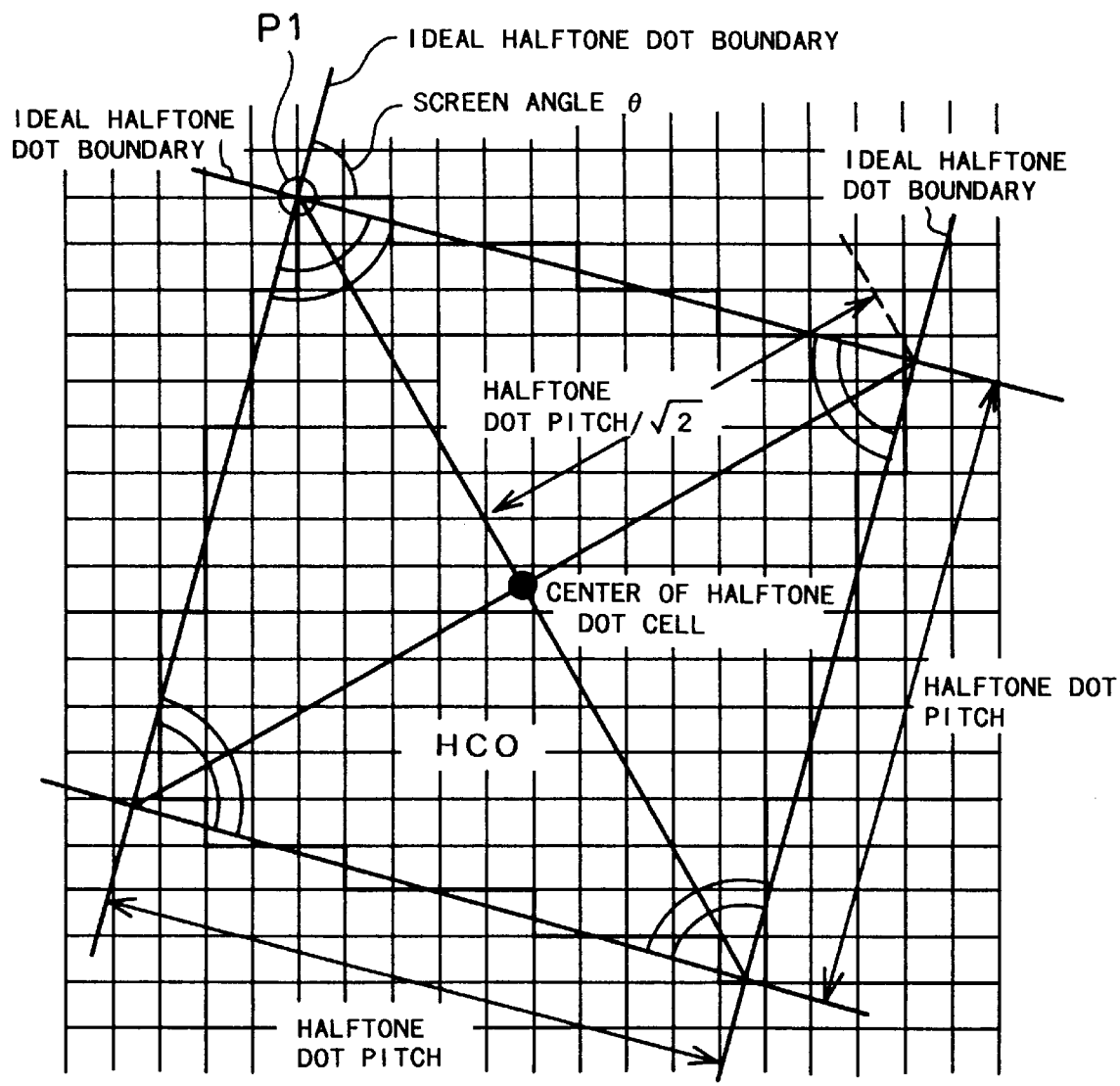
FIG. 7 is an explanatory diagram showing an enlarged view of a halftone dot cell.

In step S2 the center coordinates of the halftone dot cells in the supercell SC are calculated. FIG. 7 is an explanatory diagram showing an larged view of the halftone dot cell HC0. The straight lines marked "IDEAL HALFTONE DOT BOUNDARY" in FIG. 7 are not the step-like boundaries of the pixels, but the boundaries in the screen structure formed by the halftone dot pitch and the screen angle θ. An area enclosed by the ideal halftone dot boundaries will hereinafter be called a "ideal halftone dot cell" or a "ideal halftone dot area."

The upper left corner of the halftone dot cell HC0 coincides with the corner P1 of the supercell SC (see FIG. 6). Further, as shown in FIG. 7, the center of the ideal halftone dot cell HC0 is located at a distance of (halftone dot pitch)$\sqrt{2}$ in the direction of (screen angle+45°) from the corner of the ideal halftone dot cell HC0. The coordinates of the center of the halftone dot cell HC0 can therefore be calculated from the coordinates of the corner P1 of the supercell SC. Moreover, since the centers of the other halftone dot cells are located apart from the center of the halftone dot cell HC0 by the halftone dot pitch, they can be similarly calculated.

In step S3, the positions and directions of the ideal halftone dot boundaries are calculated from the halftone dot pitch and the screen angle. As is clear also from FIG. 6, the ideal halftone dot boundaries are straight lines passing through the corners P1–P4 of the supercell SC and oriented in the direction of screen angle θ(or θ±90°). When the supercell includes a larger number of halftone dot cells, ideal halftone dot boundaries that do not pass through corners of the supercell may also be present. This is not a problem, however, since each such ideal halftone dot boundary is located apart from an ideal halftone dot boundary that passes through a corner of the supercell by an integer multiple of the halftone dot pitch. Thus the position and direction of all ideal halftone dot boundaries in the supercell can be calculated from the halftone dot pitch and the screen angle.

Figure 8:
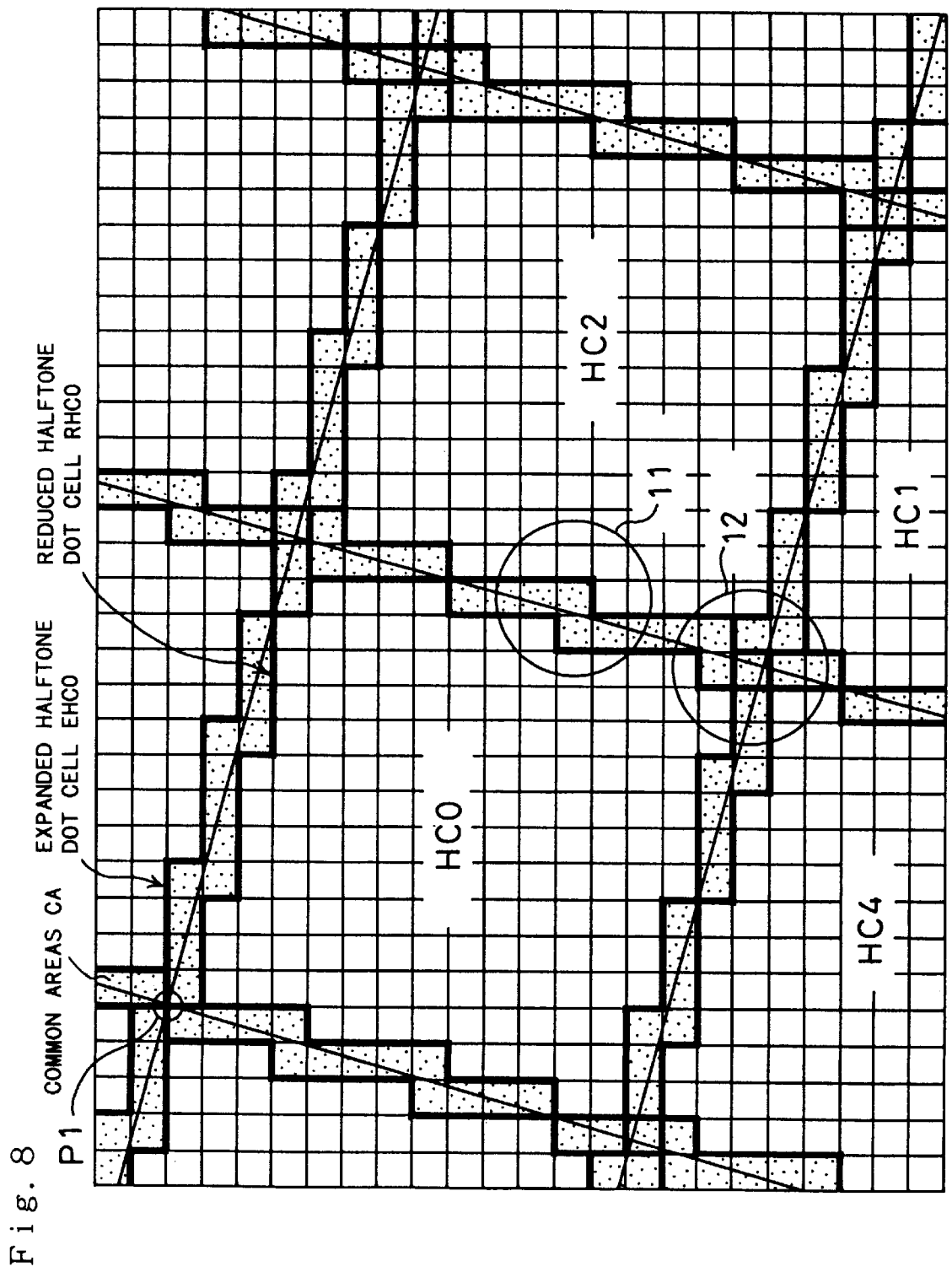
FIG. 8 is an explanatory diagram showing an enlarged view of halftone dot cells HC0 and HC2.

In step S4, an expanded halftone dot cell fully enclosing the ideal halftone dot boundaries is established for each halftone dot. FIG. 8 is an explanatory diagram showing an enlarged view of halftone dot cells HC0 and HC2. The speckled areas of FIG. 8 are common areas CA established between adjacent halftone dot cells. The common areas CA are made up of pixels through which the ideal halftone dot boundaries pass. In other words, each pixel in the common areas CA is included at least partly in two or more adjacent ideal halftone dot cells. The whole area of a halftone dot cell including the common areas CA is referred to as the "expanded halftone dot cell" or the "expanded halftone dot area," while the area of the halftone dot cell not including the common areas is referred to as the "reduced halftone dot cell" or the "reduced halftone dot area." In the processing for assignment of threshold values explained in the following, the pixels in the reduced halftone dot cells and the pixels in the common areas are treated differently.

Figure 9:
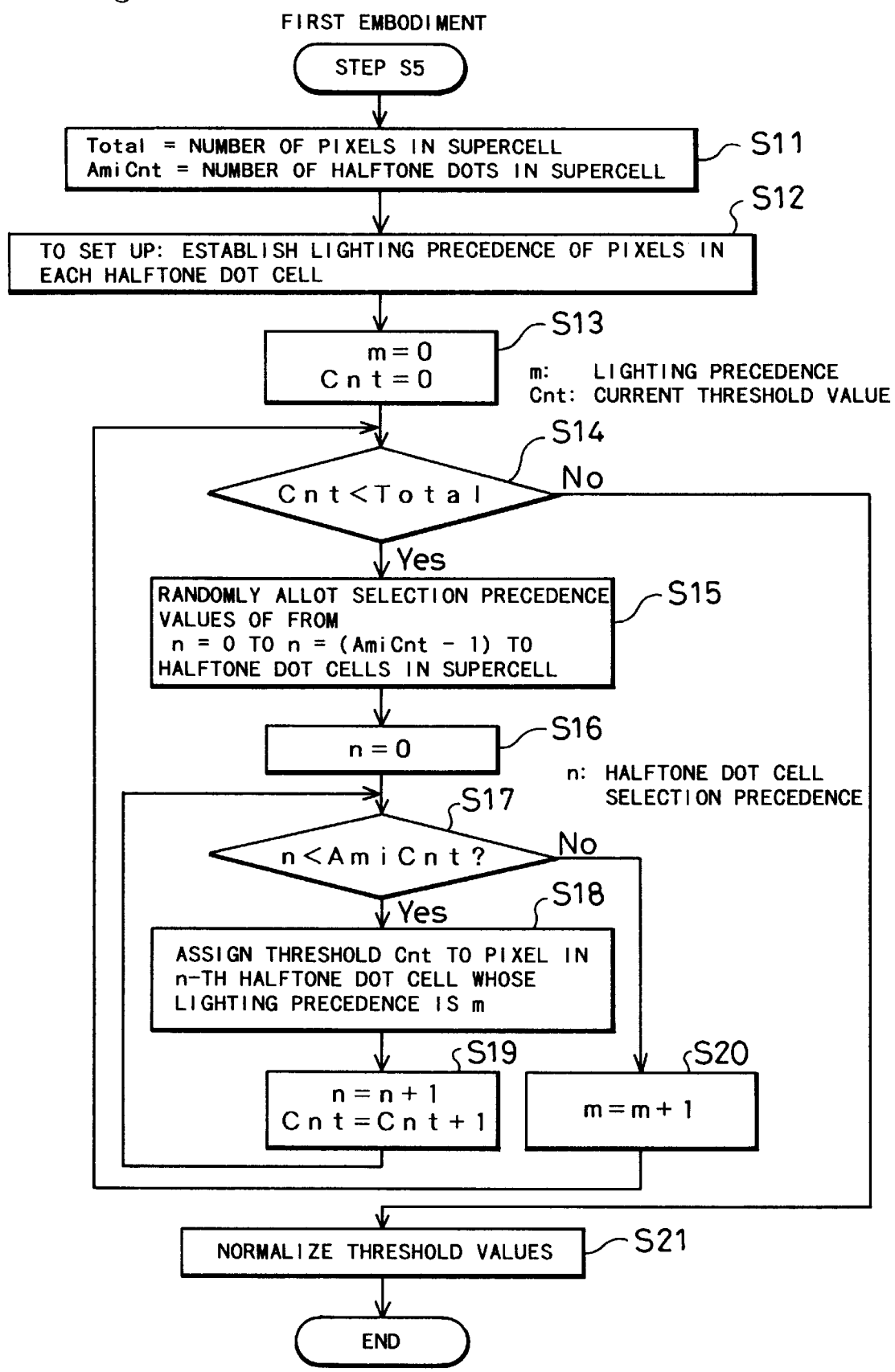
FIG. 9 is a flowchart detailing the procedures of step S5 of the first embodiment.

In step S5 of FIG. 5, threshold values are assigned to the pixels in the supercell SC. FIG. 9 is a flowchart detailing the procedures of step S5 in this first embodiment. In step 11, a pixel count Total of the supercell and a halftone dot cell count AmiCnt of the supercell are set. The pixel count Total is indicative of the total number of pixels in the supercell, and the halftone dot cell count AmiCnt indicative of the number of halftone cells in the supercell. In the example of FIG. 6, Total =936 and AmiCnt =5.

Figure 10:
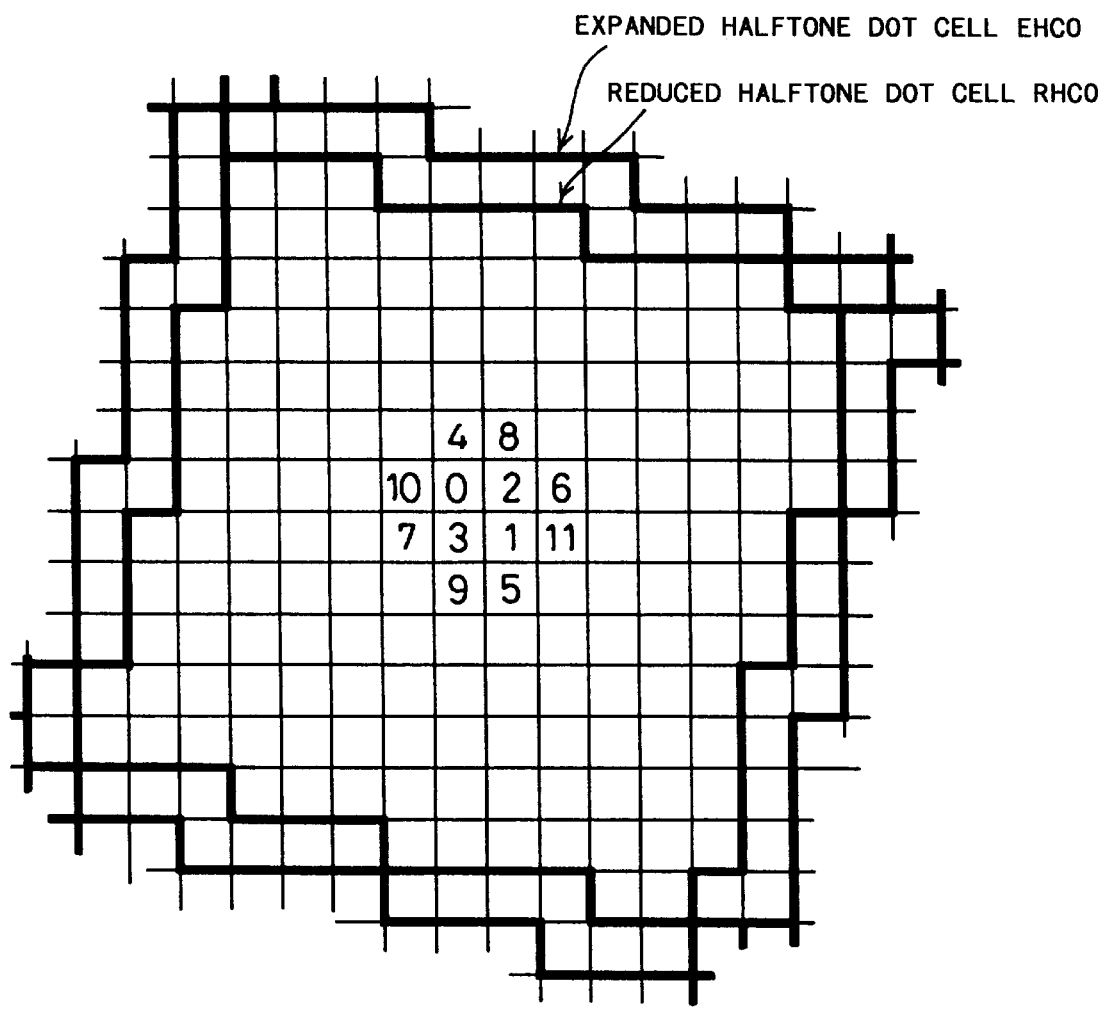
FIG. 10 is an explanatory diagram showing an example of lighting precedence values established in a reduced halftone dot cell RHCO in the halftone dot cell HC0 of FIG. 8.

In step S12, a setup step, the pixel lighting precedence values are set for each halftone dot cell. FIG. 10 is an explanatory diagram showing an example of lighting precedence values established in the reduced halftone dot cell RHC0 in the halftone dot cell HC0 of FIG. 8. In the reduced halftone dot cell RHC0, the lighting precedence values of the pixels are established so as to increase gradually from the center toward the periphery. In assigning the lighting precedence values other than the first two values 0 and 1, i.e. in assigning the lighting precedence values of 2 and higher, each successive value is assigned so that the pixel concerned is lit only after at least one of the four pixels adjacent thereto has already been lit. This is advantageous because it prevents lighting of isolated pixels.

Figure 11:
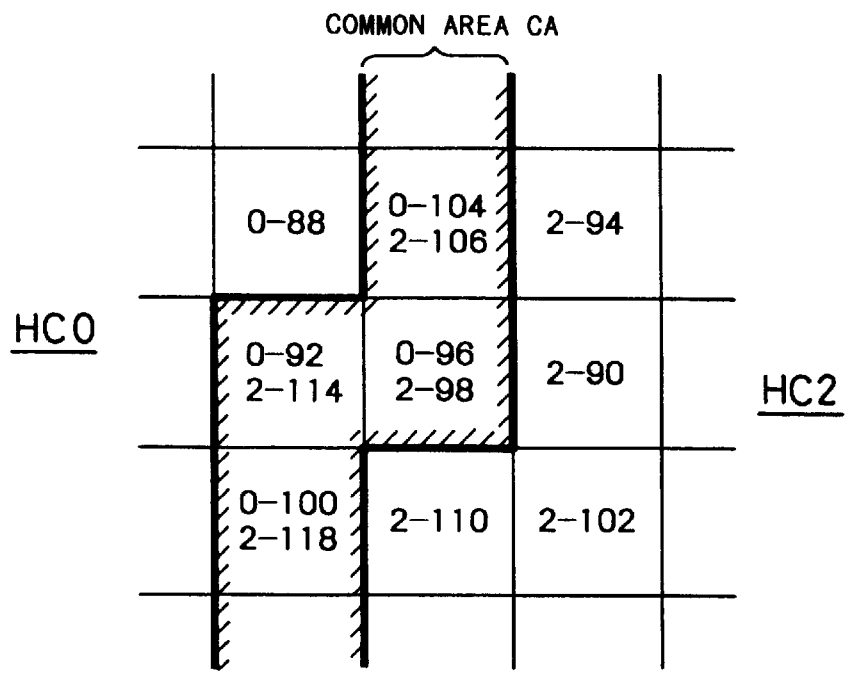
FIG. 11 is an explanatory diagram showing an example of lighting precedence values in a common area.

FIG. 11 is an explanatory diagram showing an example of the lighting precedence values established in area 11 of FIG. 8. This area includes part of the common area CA of the two adjacent halftone dot cells HC0 and HC2. This part of the common area CA is made up of pixels through which the ideal boundary between the halftone dot cells HC0 and HC2 passes. The pixels in the common area CA are assigned lighting precedence values of both of the two adjacent halftone dot cells HC0 and HC2. In FIG. 11, 0–104 means lighting precedence value 104 of the halftone dot cell HC0 and 2–106 means lighting precedence value 106 of the halftone dot cell HC2. The other notations have similar meanings. The lighting precedence values are also assigned in and around this part of the common area CA so that the pixel concerned is lit only after at least one of the four pixels adjacent thereto has already been lit.

Figure 12:
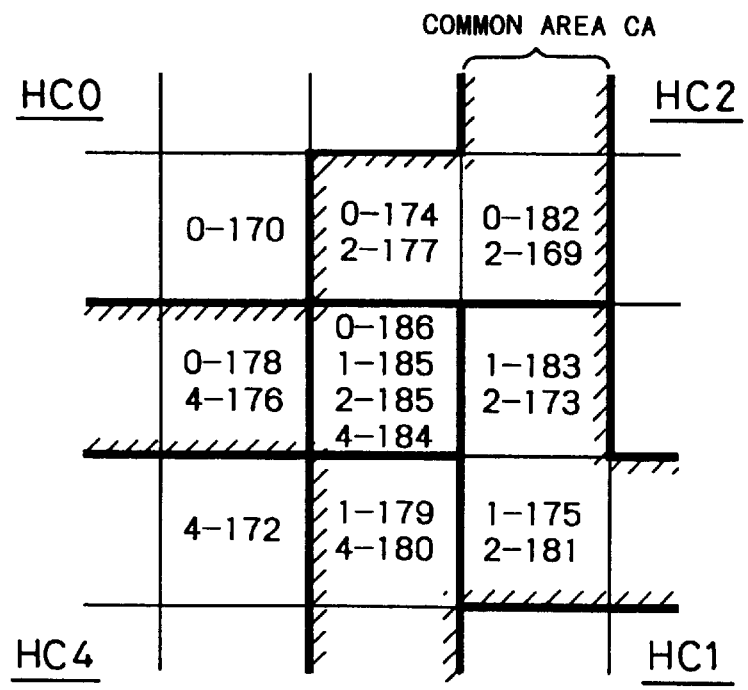
FIG. 12 is an explanatory diagram showing an example of the lighting precedence values in a common area.

FIG. 12 is an explanatory diagram showing an example of the lighting precedence values established in area 12 of FIG. 8. This area includes part of the common area CA of the four adjacent halftone dot cells HC0, HC2, HC4 and HC1. In other words, this part of the common area CA is made up of pixels through which the ideal boundaries between the halftone dot cells HC0, HC2, HC4 and HC1 pass. Though not shown in FIG. 12, the center pixel in this figure has four ideal boundaries passing through it. As this pixel is therefore common to the four halftone dot cells HC0, HC2, HC4 and HC1, it is assigned lighting precedence values of these four halftone dot cells. Each of the other pixels in this part of the common area CA is assigned lighting precedence values of two halftone dot cells. The assignment of lighting precedence values in and around the part of the common area CA shown in FIG. 12 is also conducted so that the pixel concerned is lit only after at least one of the four pixels adjacent thereto has already been lit.

In step S13 of FIG. 9, a parameter m indicating a halftone dot cell lighting precedence value and a parameter Cnt indicating the current pixel threshold value to be assigned to a pixel are established. Steps S14–S20 constitute a routine for successively assigning threshold values from 0 to (Total −1) to the pixels in the supercell SC.

In step S14, it is checked whether the current threshold Cnt is smaller than the total number of pixels in the supercell represented by the pixel count Total. When Cnt<Total, the program moves to step S15. In step S15, the halftone dot cells in the supercell are randomly allotted selection precedence values of between n=0 and n=(AmiCnt−1). For example, the five halftone dot cells HC0–HC4 in FIG. 6 are in order allotted selection precedence values of n=2, 0, 3, 1 and 4.

In step S16, the parameter n indicative of a halftone dot cell selection precedence value is initialized to 0. In step S17, it is checked whether the parameter n indicative of selection precedence value is smaller than halftone dot cell count AmiCnt. When n<AmiCnt, step S18 assigns the current threshold value Cnt to the pixel in the n-th halftone dot cell which has the lighting precedence value m. Then, in step S19, the selection precedence n and the current threshold Cnt are increased by one and the program returns to step S17.

FIGS. 13(A) and 13(B) are tables showing the processing conducted in steps S17–S19. In these tables, the values of the lighting precedence m are prefixed with the symbol # as #0, #1, . . . , and the threshold values are prefixed with the symbol * as *0, *1, . . . . The table of FIG. 13(A) shows the result of threshold value assignment for the lighting precedence m=0. The selection precedence values n assigned to the five halftone dot cells HC0–HC4 are, in order, n=2, 0, 3, 1 and 4, and the threshold values are assigned in the same order. Specifically, the pixel of the halftone dot cell HC1 whose lighting precedence m=0 is assigned the first threshold value *0, the pixel of the halftone dot cell HC3 whose lighting precedence m=0 is assigned the next threshold value *1, and so on. After all pixels in the five halftone dot cells whose lighting precedence m=0 have been assigned threshold values in this manner, step S17 finds n=AmiCnt and the program advances to step S20. In step S20, the parameter m indicating lighting precedence is increased by one and the program goes to step S14.

Step 14 checks whether the current threshold Cnt is smaller than pixel count Total indicative of the total number of pixels in the supercell. When Cnt <Total, the program advances to step S15. FIG. 13(B) shows an example of threshold value assignment with respect to the second lighting precedence m=1. Since the selection precedence n was randomly allotted in step S15 of FIG. 9, the values of the selection precedence n of the halftone dot cells in FIG. 13(B) differ from those in FIG. 13(A). In this manner, the lighting pattern in the supercell can be imparted with randomness.

When step S18 of FIG. 9 assigns threshold values to the pixels in such parts of the common area CA as shown in FIGS. 11 and 12, the processing is conducted to satisfy a condition, as will now be explained. When a threshold value is to be assigned to a pixel in the common area CA of a given halftone dot cell, it is possible that the pixel concerned has already been assigned a threshold value as a pixel of another halftone dot cell. In such case, the threshold value concerned is assigned to the next pixel of the current halftone dot cell. For instance, it may happen that at the time the center pixel in FIG. 11 is to be assigned a threshold value as a pixel of the halftone dot cell HC2, this pixel has already been assigned a threshold value as a pixel of the halftone dot cell HC0. In this case, the current threshold value is assigned to the pixel of the current halftone dot cell HC2 whose lighting precedence comes next. In other words, notwithstanding that two or more lighting precedence values are established for the pixels in the common areas, a pixel that has once been assigned a threshold value is thereafter not assigned another threshold value.

Steps S14 through S20 of FIG. 9 are repeatedly executed until all threshold values from Cnt=0 to (Total−1) have been successively assigned to the pixels in the supercell. Then, in step S21, threshold value normalization is conducted if required. If a final threshold value range of 0 to 254 is desired, for example, it suffices to convert the threshold values assigned in steps S14 through S20 to integers by multiplying each by 254/(Total−1).

In the first embodiment, the assigment of lighting precedence in each halftone dot cell is conducted with respect to the expanded halftone dot cell including its common areas common with adjacent halftone dot cells. In other words, the pixels in a common area are treated as being included in each of the adjacent halftone dot cells that include the common area. Therefore, at the time of successively assigning threshold values in the supercell, a relatively high degree of freedom can be obtained regarding selection of pixels assigned threshold values in the vicinity of the halftone dot cell boundaries. The first embodiment further decides the selection precedence values of the N pieces of halftone dot cells in the supercell randomly each time N pieces of threshold values are to be assigned to N pieces of pixels in the supercell, and assigns threshold values to the pixels in the halftone dot cells in accordance with this selection precedence. As a result, the areas of the halftone dots (i.e., the numbers of pixels constituting the halftone dots) are substantially equal at almost all the range of the halftone dot area rate, the difference being 1 or 2 pixels at the most. In addition, the halftone dots can be easily made to interconnect substantially simultaneously when the halftone dot area rate is about 50%. More specifically, all halftone dots connect when the halftone dot area is between about 50% and about 55%.

Figure 14:
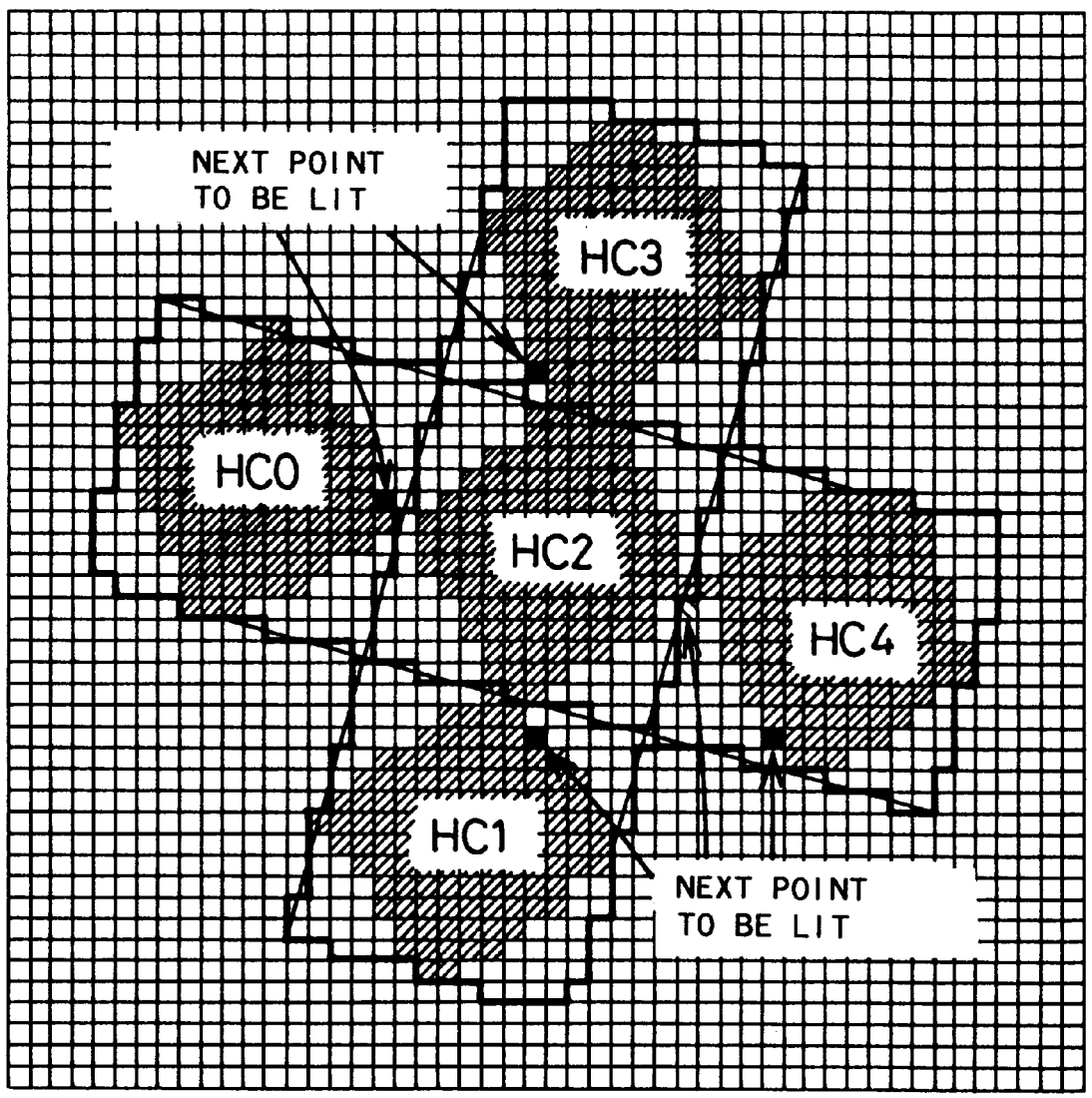
FIG. 14 is an explanatory diagram showing an example of halftone dots formed using threshold values determined in accordance with the first embodiment when the halftone dot area rate is about 50%.
Figure 15:
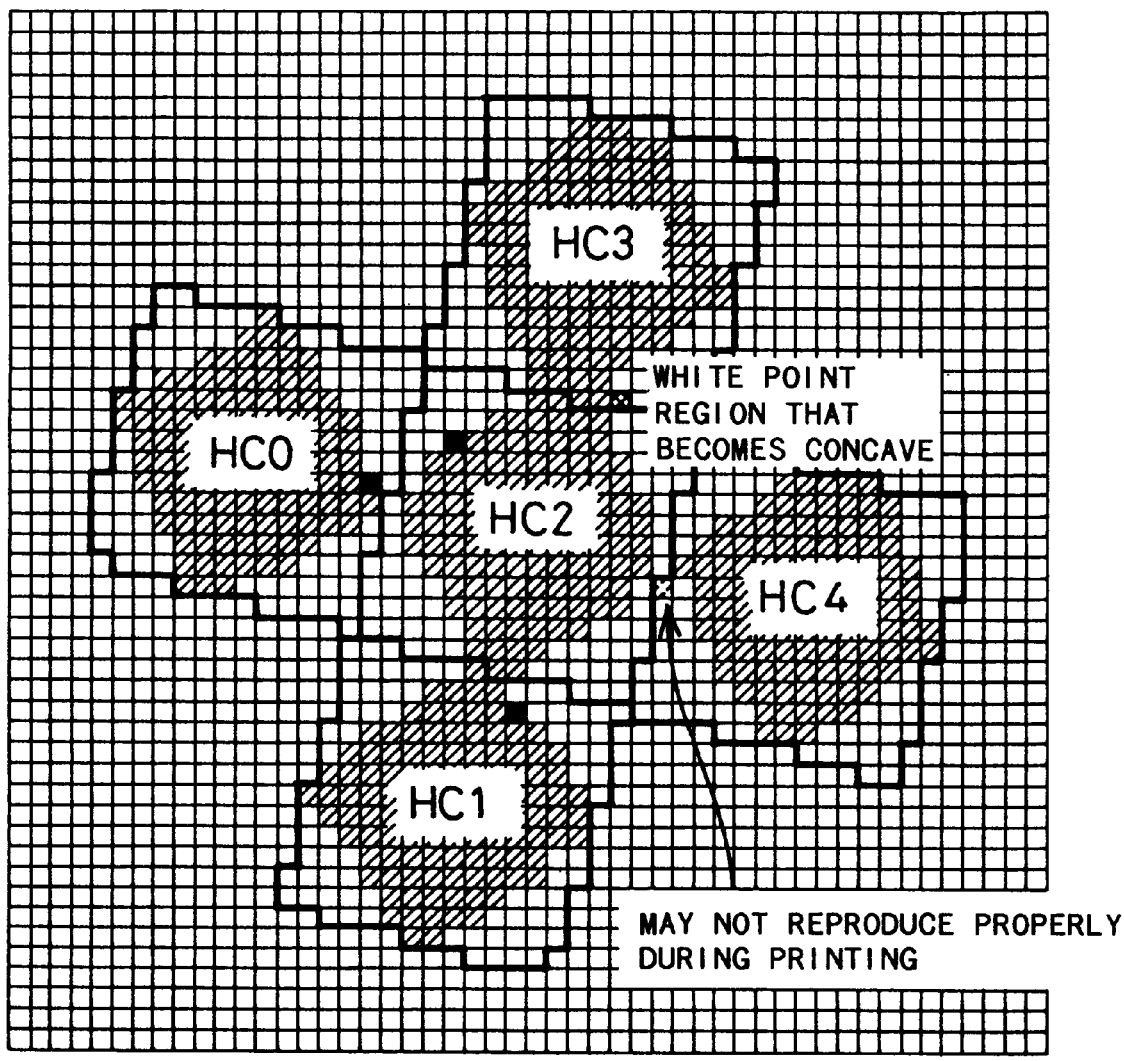
FIG. 15 is an explanatory diagram showing an example of halftone dots formed by a prior-art method analogous to that of the first embodiment.

FIG. 14 is an explanatory diagram showing an example of halftone dots formed using threshold values determined in accordance with the first embodiment when the halftone dot area rate is about 50%. The arrows point to the next pixels to be lit in the respective halftone dot cells. In the center halftone dot cell HC2, the next pixel to be lit is near the boundary with the halftone dot cell HC4. The conventional method of defining halftone dot cells would include this pixel in the halftone dot cell HC4. Since the first embodiment establishes the common areas in the vicinity of the halftone dot cell boundaries, however, this pixel will be lit as a pixel of the halftone dot cell HC2. In addition, the lighting precedence in the halftone dot cells is determined so as to avoid isolated lit pixels (an isolated lit pixel being defined as a lit pixel having no lit pixel on any of its four sides). FIG. 15 is an explanatory diagram showing an example of halftone dots formed by a prior-art method analogous to that of the first embodiment. In this prior-art example, the halftone dot cells HC0–HC4 are clearly divided and no common areas are established. Because of this, there is little freedom in assigning threshold values. Moreover, an isolated lit pixel is formed in the halftone dot cell HC4 near the boundary between the halftone dot cells HC2 and HC4. An isolated lit pixel like this (also called "spray") may not be properly reproduced during printing. In contrast, as is clear from FIG. 14, the first embodiment produces no isolated lit pixels and thus overcomes this problem regarding printing reproducibility.

Figure 16:
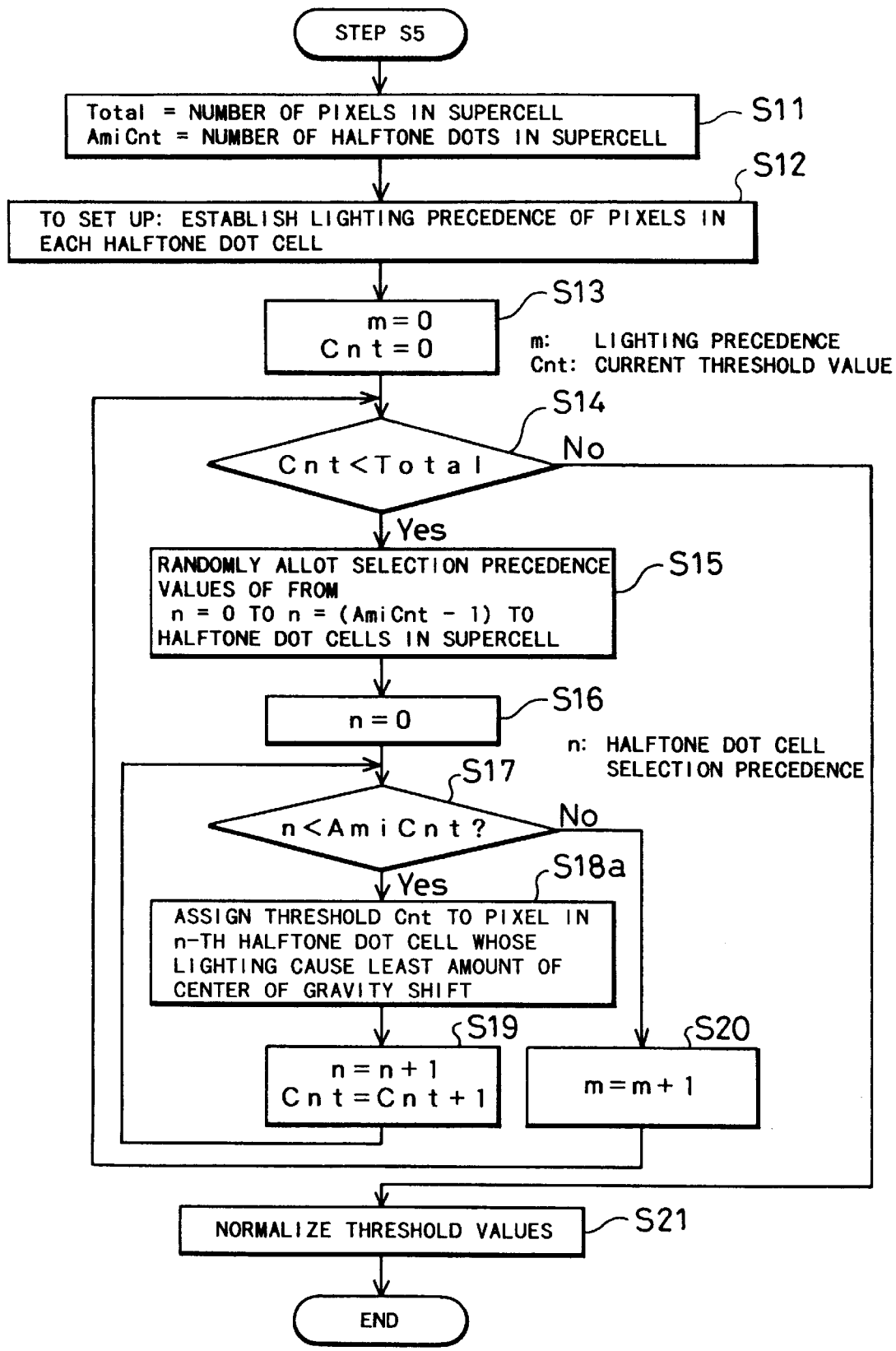
FIG. 16 is a flowchart detailing the processing procedure of step S5 in a second embodiment.

FIG. 16 is a flowchart of the processing procedure of step S5 in a second embodiment of the invention. In the second embodiment, the procedure of step S18 of the first embodiment shown in FIG. 9 is modified to step S18a in FIG. 16. In step S18a of FIG. 16, at the time of assigning threshold values in the n-th halftone dot cell, the pixels are selected so as to minimize the amount of shift of the halftone dot cell center of gravity. At this time, a calculation is made with respect to a few (preferably 3 or 4) pixels with earlier lighting precedence among the unlit pixels in the n-th halftone dot cell to determine the amount of shift of the center of gravity when these pixels are lit. The current threshold value Cnt is assigned to the pixel among these pixels whose lighting causes the least amount of shift in the center of gravity. The second embodiment enables the centers of gravity of the halftone dots to be kept substantially constant irrespective of the halftone dot area rate.

Figure 17:
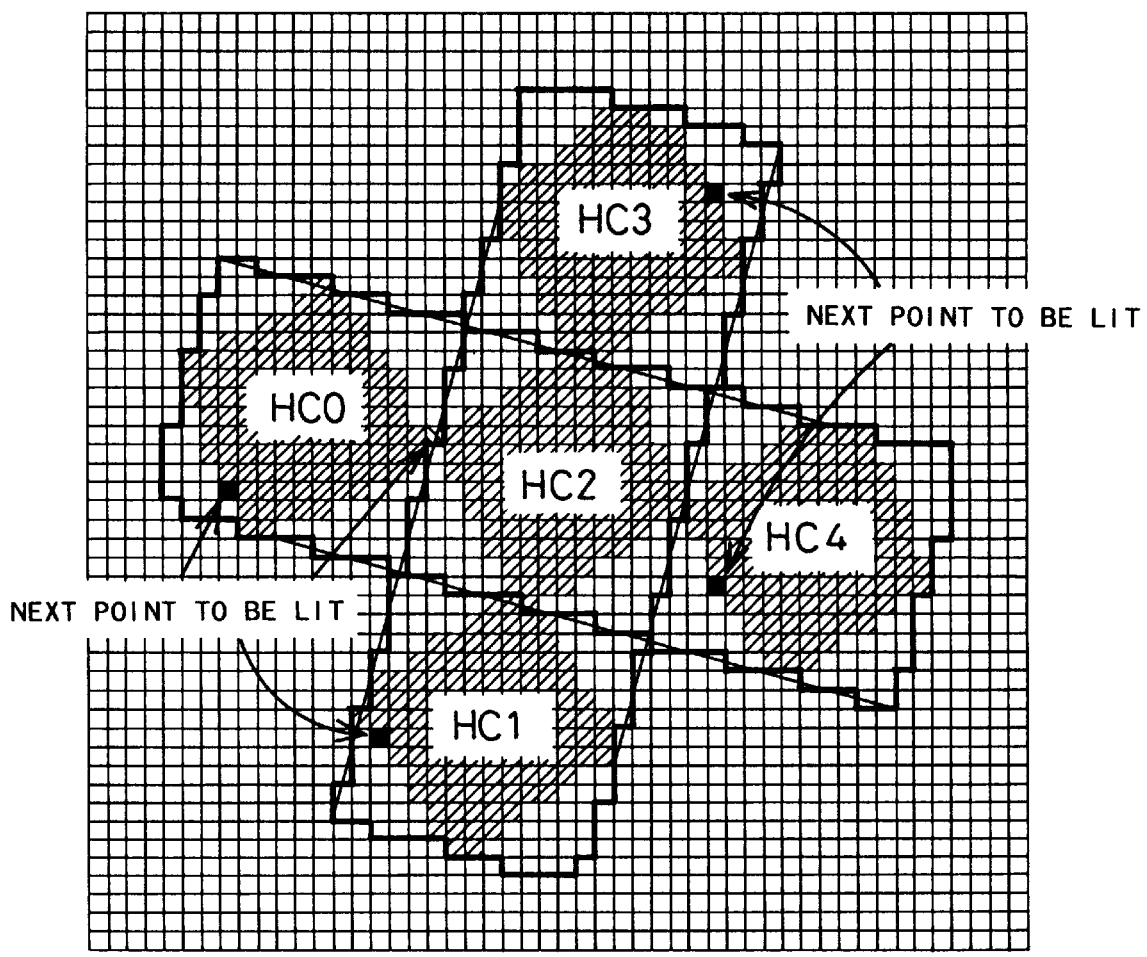
FIG. 17 is an explanatory diagram showing an example of halftone dots formed using threshold values determined in accordance with the second embodiment when the halftone dot area rate is about 50%.
Figure 18:
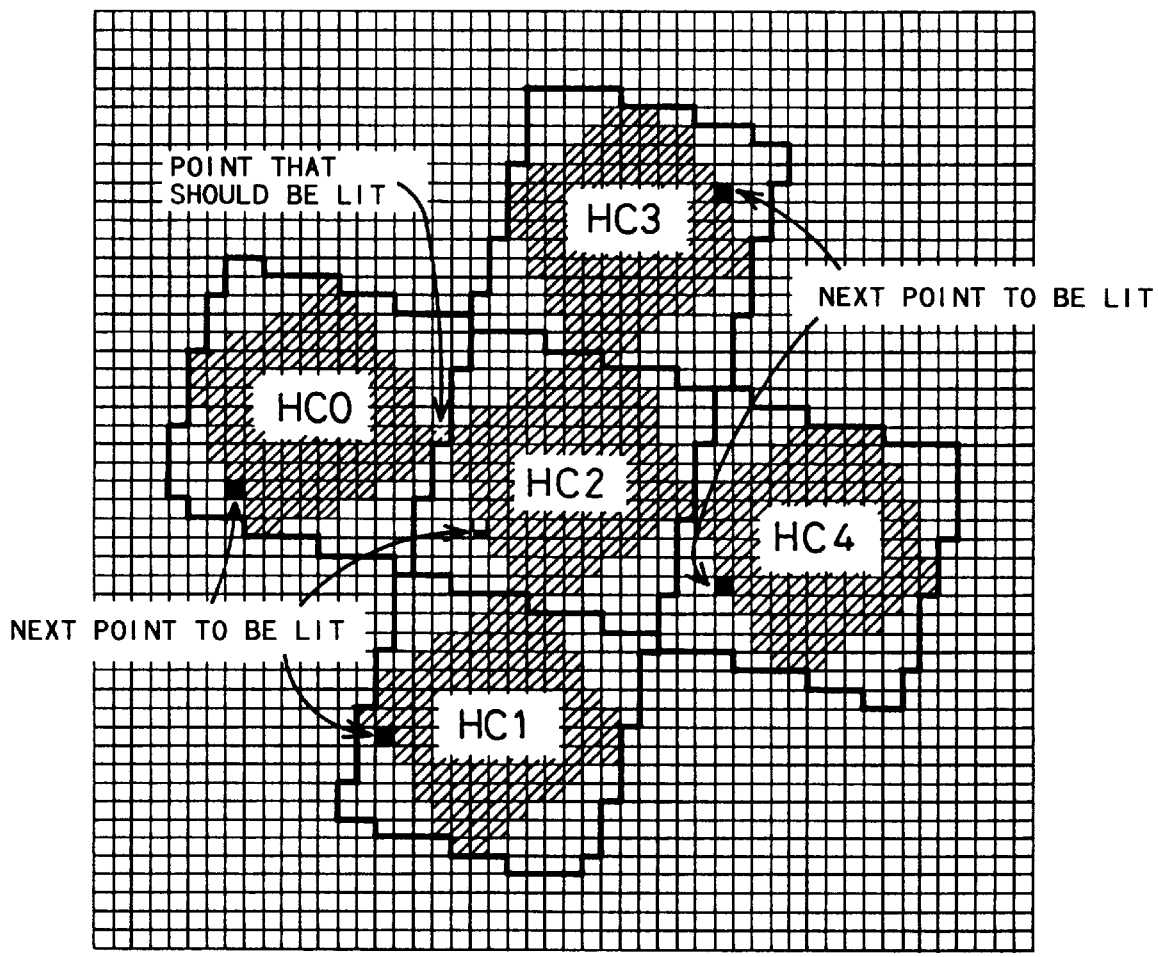
FIG. 18 is an explanatory diagram showing an example of halftone dots formed by a prior-art method analogous to that of the second embodiment.

FIG. 17 is an explanatory diagram showing an example of halftone dots formed using threshold values determined in accordance with the second embodiment when the halftone dot area rate is about 50%. FIG. 18 is an explanatory diagram showing an example of halftone dots formed by a prior-art method analogous to that of the second embodiment. In the prior-art example of FIG. 18, a point that should be lit (a point whose lighting minimizes center of gravity shift) is present near the boundary between the halftone dot cells HC0 and HC2. Owing to the conventional strict division of the halftone dot cells, however, this point cannot be assigned a threshold value to make it to be lit. In contrast, in the example according to the second embodiment shown in FIG. 17, the greater flexibility in threshold value assignment achieved by establishment of the common areas in the vicinity of the halftone dot cell boundaries makes it possible to assign a threshold value so that this point that should be lit actually is.

Figure 19:
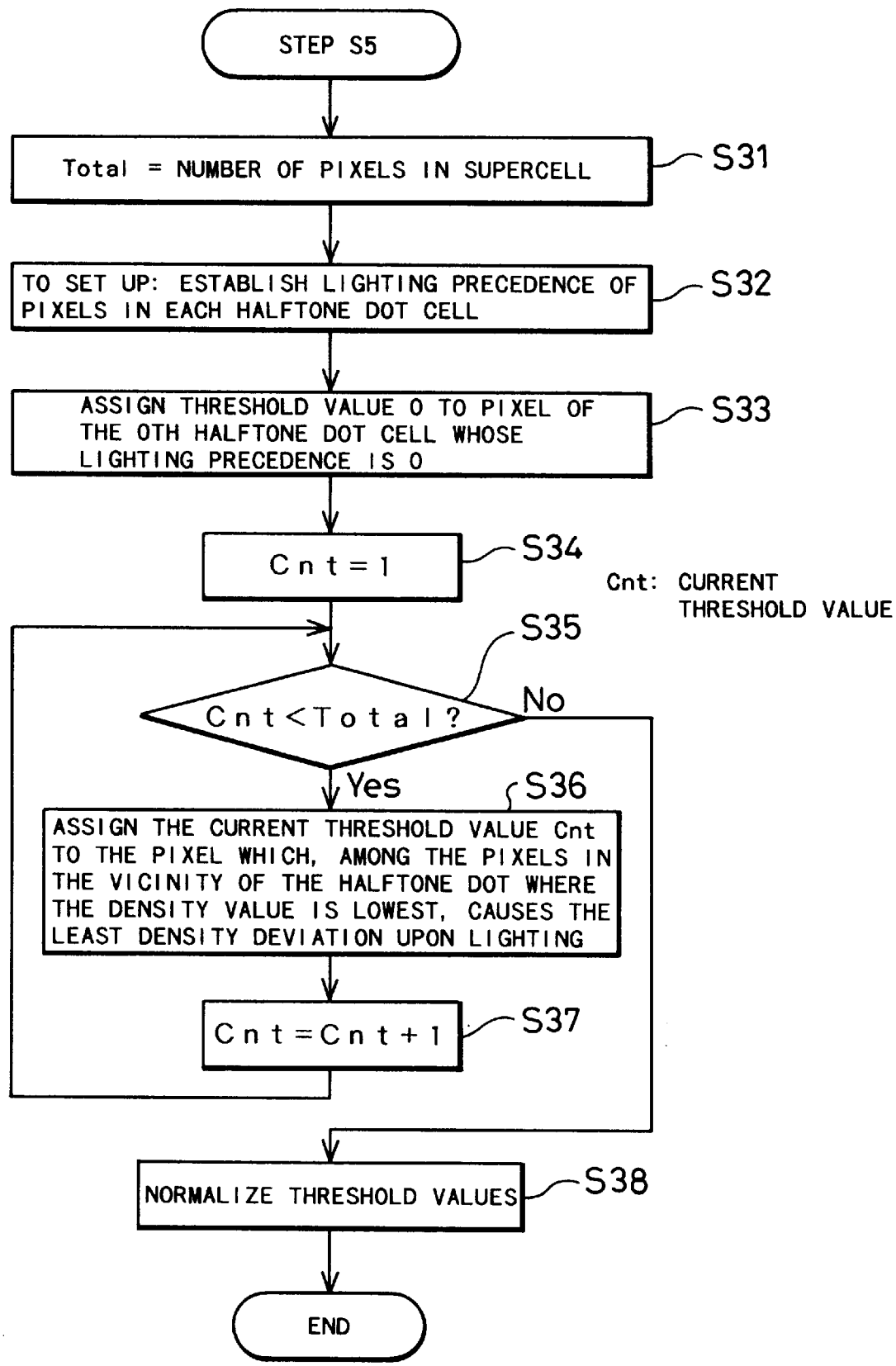
FIG. 19 is a flowchart detailing the processing procedure of step S5 in a third embodiment.

FIG. 19 is a flowchart of the processing procedure of step S5 in a third embodiment of the invention. In step S31, the pixel count Total (=936) of the supercell is set. In step S32, a setup step, the pixel lighting precedence values are set for each halftone dot cell. This step is the same as step S12 in FIG. 9. In step S33, threshold value 0 is assigned to the pixel of the 0th halftone dot cell whose lighting precedence is 0. Any halftone dot cell in the supercell can be selected as the 0th halftone dot cell.

In step S34, a parameter Cnt indicating the current pixel threshold value to be assigned to a pixel is established. In step S35, it is checked whether the current threshold Cnt is smaller than the total number of pixels in the supercell represented by the pixel count Total. When Cnt<Total, the program moves to step S36.

In step S36, the pixel which, among the pixels in the vicinity of the halftone dot where the density value is lowest, causes the least density deviation upon lighting is selected with reference to the selection precedence established in the setup and the selected pixel is assigned the current threshold value Cnt. By the "density value" of a point here is meant the value obtained by averaging binary data indicative of the lit/unlit state of the pixels (1 for black or the lit, 0 for white or the unlit) using a weighting function having a distribution near a Gaussian distribution centered on the point concerned. Further, this density value is substantially equal to the density value reading obtained with a densitometer. By "density deviation" is meant the difference between the largest and smallest density values measured (calculated) at a plurality of density value measurement locations in the halftone dot image. The density value measurement locations may be selected from the center points of the halftone dot cells, intermediate points between the center points of the halftone dot cell. In step S36, the density deviation is calculated for the case where a number of pixels are selected as candidates for lighting and lit one by one according to the lighting precedence. The pixel whose lighting causes the least density deviation is selected and assigned the threshold value. When threshold values are assigned to minimize density deviation in this manner, greater reduction of image unevenness can be achieved.

In step S37, the current threshold Cnt is increased by one and the program returns to step S35. Steps S35 through S37 are repeatedly executed until all pixels in the supercell have been assigned threshold values. In step S38, the threshold values are normalized. This is the same as step S21 in FIG. 9.

Figure 20:
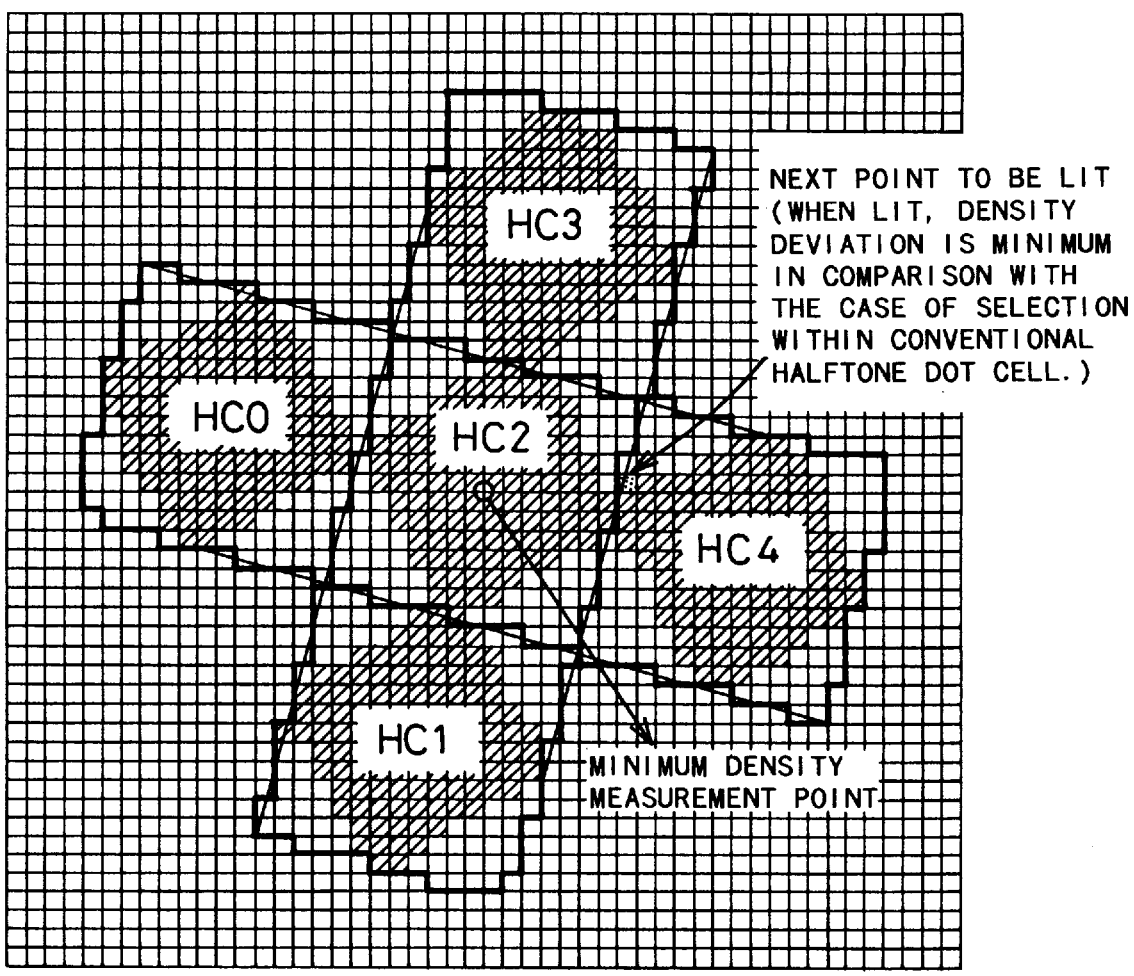
FIG. 20 is an explanatory diagram showing an example of halftone dots formed using threshold values determined in accordance with the third embodiment when the halftone dot area rate is about 50%.
Figure 21:
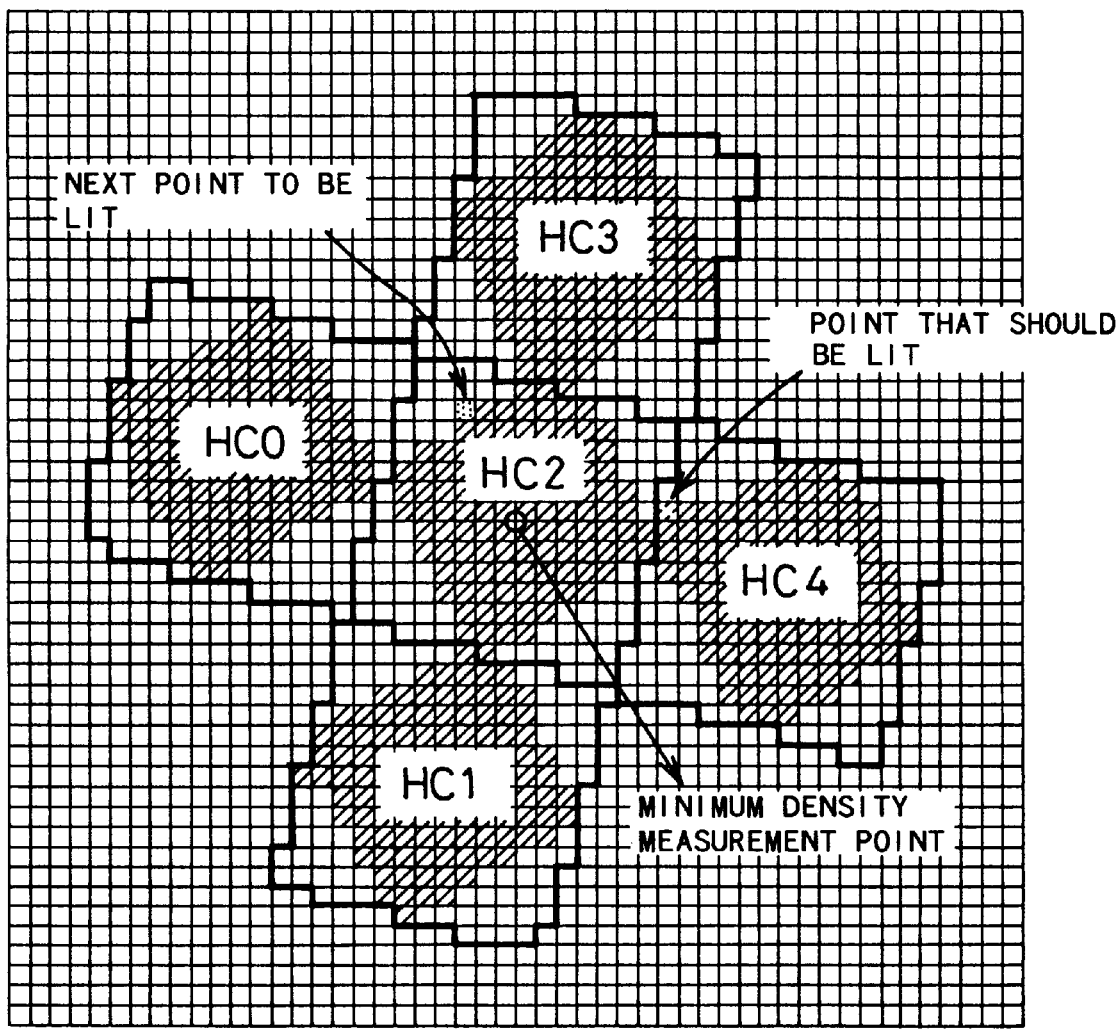
FIG. 21 is an explanatory diagram showing an example of halftone dots formed by a prior-art method analogous to that of the third embodiment.

FIG. 20 is an explanatory diagram showing an example of halftone dots formed using threshold values determined in accordance with the third embodiment when the halftone dot area rate is about 50%. FIG. 21 is an explanatory diagram showing an example of halftone dots formed by a prior-art method analogous to that of the third embodiment. In the prior-art example of FIG. 21, a point that should be lit (a point whose lighting minimizes density deviation) is present near the boundary between the halftone dot cells HC2 and HC4. Owing to the conventional strict division of the halftone dot cells, however, this point cannot be assigned a threshold value to make it light. In contrast, in the example according to the third embodiment shown in FIG. 20, the greater flexibility in threshold value assignment achieved by establishment of the common areas in the vicinity of the halftone dot cell boundaries makes it possible to assign a threshold value so that this point that should be lit actually As explained in the foregoing, the embodiments of the invention establish common areas in the vicinity of the boundaries between adjacent halftone dot cells and plural lighting precedence values are established for the pixels in the common areas as if these pixels belonged to all of the adjacent halftone dot cells that include the common area concerned. Greater freedom can therefore be obtained at the time of assigning threshold values in the vicinity of the halftone dot cell boundaries.

Figure 22:
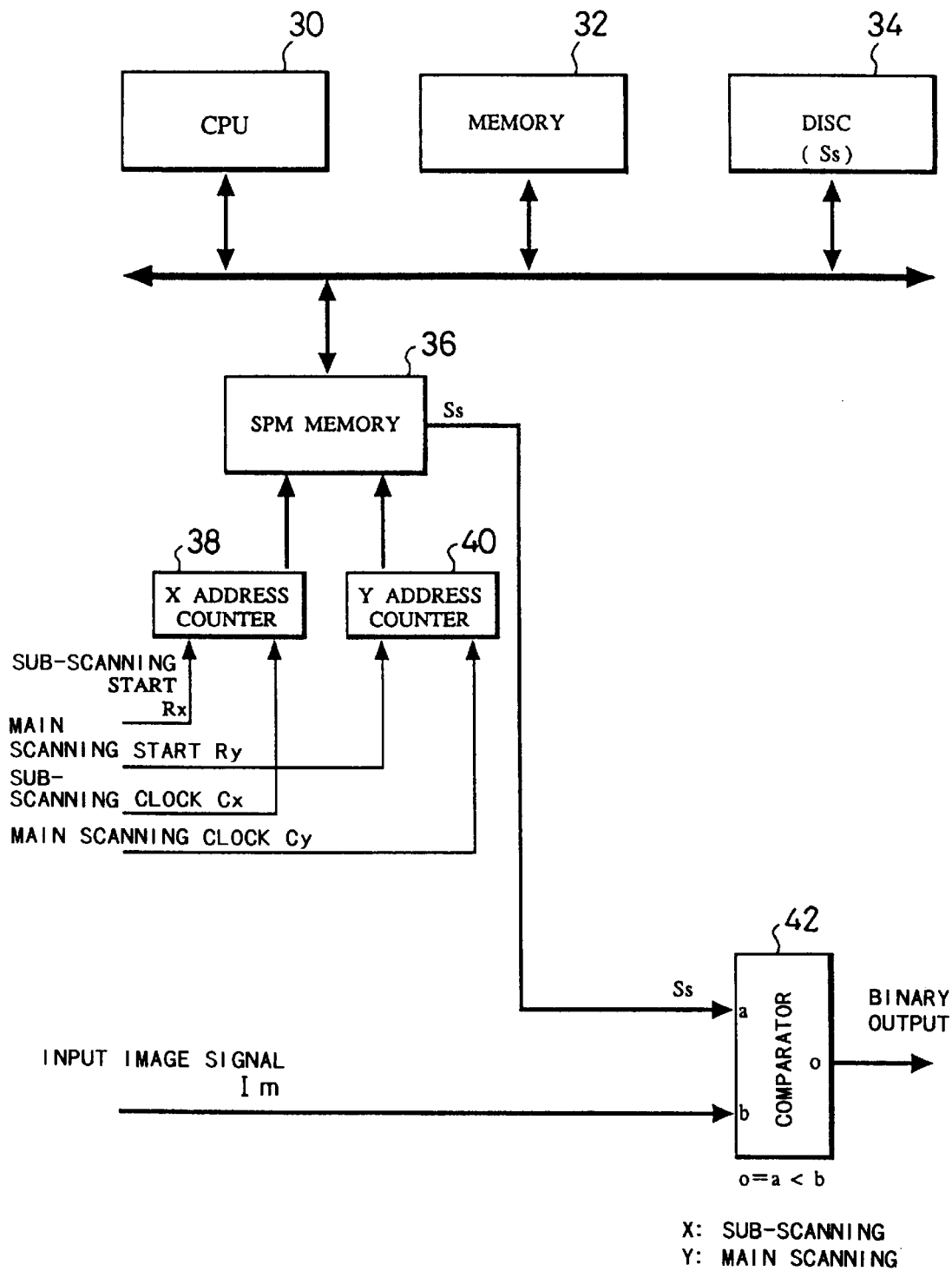
FIG. 22 is a block diagram showing the configuration of a halftone dot forming system.

FIG. 22 is a block diagram showing the configuration of a halftone dot forming apparatus for applying the foregoing embodiments. The halftone dot forming apparatus is a computer system comprising a CPU 30, a main memory 32 including ROM and RAM, a floppy disk drive 34, Screen Pattern Memory (SPM) 36, a sub-scanning address counter 38, a main scanning address counter 40 and a comparator 42. The halftone dot forming apparatus is also equipped with an exposure device (not shown) for recording a halftone dot image on a recording medium by use of a light beam. The SPM 36 stores the threshold value pattern of the supercell. The floppy disk drive 34 stores several types of threshold value patterns produced by the embodiments explained in the foregoing. One of these patterns is selected and transferred to the SPM 36.

The various functions of the foregoing embodiments for assigning threshold values within the supercell are accomplished by the CPU (microprocessor) 30 of the computer system through the execution of computer programs. The computer programs providing these functions are loaded into the main memory or an external memory of the computer system from a floppy disk, CD-ROM or other such portable recording medium. Alternatively, it can be supplied to the computer system from a program supply apparatus via a communication channel.

The sub-scanning address counter 38 is input with a sub-scanning start signal Rx and a sub-scanning clock signal Cx. The sub-scanning start signal Rx is produced as a single pulse when the sub-scanning coordinates of the light beam are reset to the initial position. The sub-scanning clock signal Cx is produced as a single pulse each time the sub-scanning coordinates of the light beam are updated. The sub-scanning address counter 38 repeatedly generates light beam sub-scanning coordinates within a unit block in response to the signals Rx and Cx and supplies the generated sub-scanning coordinates to the SPM 36 as sub-scanning address data. Similarly, the main scanning address counter 40 repeatedly generates light beam main scanning coordinates within the unit block in response to a main scanning start signal Ry and a main scanning clock signal Cy and supplies the generated main scanning coordinates to the SPM 36 as main scanning address data. In response to addresses from the address counters 38 and 40, one threshold value Ss is read from the threshold value pattern stored in the SPM 36 and is supplied to the comparator 42.

The comparator 42 compares the threshold value Ss with an input image signal Im and generates a binary output (exposure signal, halftone dot signal) according to the result of the comparison. The level of the binary signal is as follows:

When Ss<Im: H level (exposure or lighting);

When Im$\leq$Ss: L level (no exposure or no lighting).

(When the range of the image signal Im is 0–255, the range of the threshold value Ss is 0 –254.)

The exposure device (not shown) is responsive to the digital output for causing a light beam to expose a photosensitive recording medium (such as photosensitive film) to thereby form a halftone dot image on the recording medium. Multiple color printed materials can be produced by preparing halftone dot images on YMCK color plates in this manner and overprinting the halftone dot images in the respective color inks.

Figure 23:
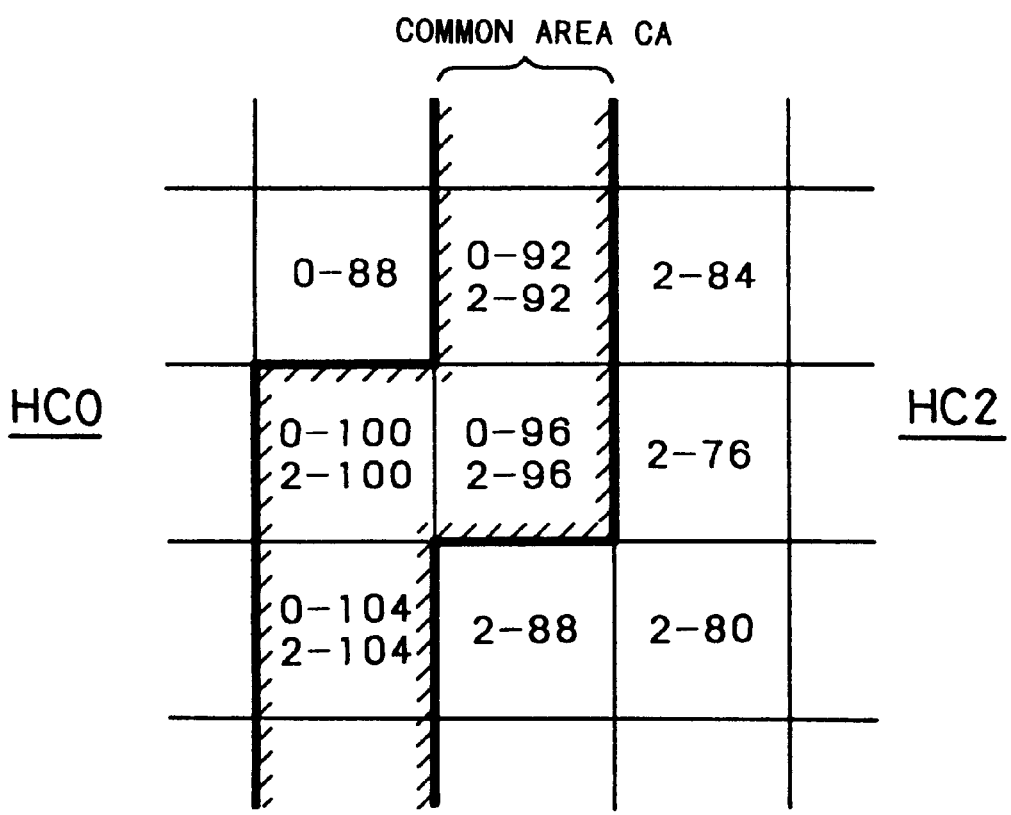
FIG. 23 is an explanatory diagram showing another example of lighting precedence in a common area.

In the described embodiments, as shown for example in FIGS. 11 and 12, the lighting order is independently established for each halftone dot cell in the common areas. As shown in FIG. 23, however, it is instead possible to assign common lighting precedence values for adjacent halftone dot cells. This is advantageous because it facilitates regulation of the connection timing (connection synchronization) among the halftone dots when the halftone dot area rate is 50%.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of forming halftone dots according to comparison of threshold values assigned to pixels in a replicated unit area with an image signals, said replicated unit area having prescribed configuration including N pieces of halftone dot areas where N is an integer of at least 2, said method comprising the steps of:

forming halftone dots whose areas are substantially equal at an arbitrary halftone dot area rate and which interconnect substantially simultaneously when a halftone dot area rate is 50%, wherein distribution of the threshold values in each said replicated unit area is determined by the steps of:

(a) establishing a common area with respect to each halftone dot area included in said replicated unit area, and establishing lighting precedence for the pixels in an expanded halftone dot areas including said common area and said each halftone dot area, said common areas being commonly included in a plurality of adjacent halftone dot areas;

(b) determining a selection order of the N pieces of halftone dot areas included in said replicated unit area each time when next N pieces of threshold values are to be assigned to pixels in said replicated unit area;

(c) successively selecting said N pieces of halftone dot areas in accordance with said determined selection order, and assigning each of said next N pieces of threshold values to a pixel which is included in said expanded halftone dot area for the selected halftone dot area and which has not been assigned a threshold value; and (d) repeating said steps (b) and (c) to thereby assign a threshold value to every pixel included in said replicated unit area.

2. A method in accordance with claim 1, wherein said step (c) comprises a step of selecting a pixel to be assigned a threshold value in accordance with said lighting precedence in said expanded halftone dot area.

3. A method in accordance with claim 1, wherein said step (c) comprises a step of selecting a pixel to be assigned a threshold value so as to minimize a shift of a center of gravity of halftone dots included in said expanded halftone dot area.

4. A method in accordance with claim 1, wherein said step (c) comprises a step of selecting a pixel to be assigned a threshold value so as to minimize deviation of a density value calculated for prescribed points in said replicated unit area.

5. An apparatus for forming halftone dots according to comparison of threshold values assigned to pixels in a replicated unit area with an image signal, said replicated unit area having prescribed configuration including N pieces of halftone dot areas where N is an integer of at least 2, said apparatus comprising:

a memory storing said threshold values, said threshold values being determined such that halftone dots are to be formed whose areas are substantially equal at an arbitrary halftone dot area rate and which interconnect substantially simultaneously when a halftone dot area rate is 50%; and a comparator for comparing a threshold value read from said memory and said image signal to generate a halftone dot signal representing said halftone dots, further comprising:

means for determining distribution of the threshold values in each said replicated unit area, said means comprising:

(i) means for establishing a common area with respect to each halftone dot area included in said replicated unit area, said establishing lighting precedence for the pixels in an expanded halftone dot areas including said common area and said each halftone dot area, said common areas being commonly included in a plurality of adjacent halftone dot areas;

(ii) means for determining a selection order of the N pieces of halftone dot areas included in said replicated unit area each time when next N pieces of threshold values are to be assigned to pixels in said replicated unit area;

(iii) means for successively selecting said N pieces of halftone dot areas in accordance with said determined selection order, and assigning each of said next N pieces of threshold values to a pixel which is included in said expanded halftone dot area for the selected halftone dot area and which has not been assigned a threshold value, to thereby assign a threshold value to every pixel included in said replicated unit area.

6. An apparatus in accordance with claim 5, wherein said means for successively selecting including means for selecting a pixel to be assigned a threshold value in accordance with said lighting precedence in said expanded halftone dot area.

7. An apparatus in accordance with claim 5, wherein said means for successively selecting including means for selecting a pixel to be assigned a threshold value so as to minimize a shift of a center of gravity of halftone dots included in said expanded halftone dot area.

8. An apparatus in accordance with claim 5, wherein said means for successively selecting including means for selecting a pixel to be assigned a threshold value so as to minimize deviation of a density value calculated for prescribed points in said replicated unit area.

* * * * *